US011890875B2

(12) United States Patent
Takahashi et al.

(10) Patent No.: US 11,890,875 B2
(45) Date of Patent: *Feb. 6, 2024

(54) LIQUID CARTRIDGE HAVING PIVOTABLE LEVER PROVIDED WITH LIGHT-BLOCKING PORTION

(71) Applicant: BROTHER KOGYO KABUSHIKI KAISHA, Nagoya (JP)

(72) Inventors: Hiroaki Takahashi, Nagoya (JP); Takahiro Miyao, Nagoya (JP); Akihito Ono, Nagoya (JP); Tetsuro Kobayashi, Nagoya (JP); Fumio Nakazawa, Okazaki (JP); Kosuke Nukui, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,760

(22) Filed: May 24, 2022

(65) Prior Publication Data

US 2022/0332121 A1 Oct. 20, 2022

Related U.S. Application Data

(63) Continuation of application No. 17/015,250, filed on Sep. 9, 2020, now Pat. No. 11,351,792, which is a (Continued)

(30) Foreign Application Priority Data

Sep. 29, 2017 (JP) ................................. 2017-189579

(51) Int. Cl.
*B41J 2/175* (2006.01)

(52) U.S. Cl.
CPC ......... *B41J 2/17546* (2013.01); *B41J 2/1752* (2013.01); *B41J 2/1753* (2013.01);
(Continued)

(58) Field of Classification Search
CPC .. B41J 2/17546; B41J 2/17513; B41J 2/1752; B41J 2/17526; B41J 2/17596
(Continued)

(56) References Cited

U.S. PATENT DOCUMENTS

| | | | |
|---|---|---|---|
| 5,506,611 | A | 4/1996 | Ujita et al. |
| 8,007,091 | B2 | 8/2011 | Nakamura et al. |

(Continued)

FOREIGN PATENT DOCUMENTS

| | | | |
|---|---|---|---|
| CN | 1051011 | A | 5/1991 |
| CN | 103182847 | A | 7/2013 |

(Continued)

OTHER PUBLICATIONS

International Search Report and Written Opinion issued in related International Patent Application No. PCT/JP2018/013088, dated May 29, 2018.

(Continued)

*Primary Examiner* — Matthew Luu
*Assistant Examiner* — Alexander D Shenderov
(74) *Attorney, Agent, or Firm* — Merchant & Gould P.C.

(57) ABSTRACT

A liquid cartridge configured to be inserted into a cartridge-attachment section in an insertion direction includes a casing, and a lever supported by the casing. The lever is pivotable about a pivot axis between a first position and a second position. The lever includes a light-blocking portion configured to block or attenuate light traveling in a widthwise direction crossing the insertion direction and a gravitational direction, and a force-receiving portion positioned closer to a front wall of the casing than the light-blocking
(Continued)

portion is to the front wall in the insertion direction. The light-blocking portion is positioned lower at the second position than at the first position. The pivot axis is positioned frontward of the light-blocking portion and rearward of the force-receiving portion in the insertion direction. The lever pivots from the second position to the first position upon application of an external force to the force-receiving portion.

16 Claims, 12 Drawing Sheets

Related U.S. Application Data continuation of application No. 16/562,651, filed on Sep. 6, 2019, now Pat. No. 10,773,525, which is a continuation of application No. 15/939,489, filed on Mar. 29, 2018, now Pat. No. 10,421,284.

(52) U.S. Cl.
CPC ....... *B41J 2/17509* (2013.01); *B41J 2/17513* (2013.01); *B41J 2/17523* (2013.01); *B41J 2/17526* (2013.01); *B41J 2/17553* (2013.01); *B41J 2/17596* (2013.01)

(58) Field of Classification Search
USPC .......................................................... 347/86
See application file for complete search history.

(56) References Cited

U.S. PATENT DOCUMENTS

| | | | |
|---|---|---|---|
| 9,815,288 | B2 | 11/2017 | Wang |
| 2006/0164482 | A1 | 7/2006 | Katayama et al. |
| 2010/0103231 | A1 | 4/2010 | Iwamura et al. |
| 2010/0245413 | A1 | 9/2010 | Kanbe et al. |
| 2011/0234716 | A1 | 9/2011 | Kubo et al. |
| 2013/0033552 | A1 | 2/2013 | Chen et al. |
| 2013/0050358 | A1 | 2/2013 | Kanbe et al. |
| 2013/0162733 | A1 | 6/2013 | Nakamura et al. |
| 2014/0168324 | A1 | 6/2014 | Sasaki |
| 2014/0300671 | A1 | 10/2014 | Nie |
| 2015/0183224 | A1 | 7/2015 | Kanbe et al. |
| 2016/0167392 | A1 | 6/2016 | Xia et al. |
| 2016/0279959 | A1 | 9/2016 | Okazaki et al. |
| 2017/0282580 | A1 | 10/2017 | Takahashi et al. |
| 2017/0282584 | A1 | 10/2017 | Nukui |
| 2018/0003704 | A1 | 1/2018 | Horii et al. |

FOREIGN PATENT DOCUMENTS

| | | | |
|---|---|---|---|
| CN | 103373076 | A | 10/2013 |
| CN | 107264042 | A | 10/2017 |
| CN | 107264044 | A | 10/2017 |
| CN | 207028521 | U | 2/2018 |
| CN | 207028522 | U | 2/2018 |
| EP | 2 524 810 | A1 | 11/2012 |
| EP | 3 208 094 | A1 | 8/2017 |
| EP | 3 225 401 | A1 | 10/2017 |
| EP | 3 225 402 | A1 | 10/2017 |
| EP | 3 228 460 | A1 | 10/2017 |
| EP | 3 260 298 | A1 | 12/2017 |
| JP | 2006-21483 | A | 1/2006 |
| JP | 2013-49164 | A | 3/2013 |
| JP | 2013-049167 | A | 3/2013 |
| JP | 2016-206485 | A | 12/2016 |

OTHER PUBLICATIONS

Extended European Search Report issued in related European Patent Application No. 18165153.0, dated Sep. 21, 2018.
Extended European Search Report issued in related European Patent Application No. 18165159.7, dated Sep. 4, 2018.
Extended European Search Report issued in related European Patent Application No. 18165149.8, dated Sep. 4, 2018.
Extended European Search Report issued in related European Patent Application No. 18165164.7, dated Sep. 10, 2018.
Office Action issued in related U.S. Appl. No. 15/939,388, dated Nov. 6, 2018.
Office Action issued in related U.S. Appl. No. 15/939,671, dated Nov. 16, 2018.
Office Action issued in related U.S. Appl. No. 15/939,460, dated Dec. 4, 2018.
Office Action issued in related U.S. Appl. No. 15/939,671, dated Mar. 12, 2019.
Office Action issued in related U.S. Appl. No. 15/939,671, dated Jul. 11, 2019.
Office Action issued in related U.S. Appl. No. 15/939,671, dated Nov. 4, 2019.
Notice of Allowance issued in related U.S. Appl. No. 16/905,267, dated Mar. 12, 2021.
Search Report and Written Opinion issued in related Singaporean Patent Application No. 11202009636S, dated Jun. 1, 2021.
Office Action issued in corresponding Australian Patent Application No. 2018416232, dated Jun. 8, 2021.
Examination Report issued in corresponding New Zealand Patent Application No. 768012, dated Jul. 30, 2021.
Office Action issued in related Chinese Patent Application No. 201880091892.7, dated Jul. 30, 2021.
Office Action issued in related Canadian patent application No. 3,094,042, dated Oct. 22, 2021.

LIQUID CARTRIDGE HAVING PIVOTABLE LEVER PROVIDED WITH LIGHT-BLOCKING PORTION

CROSS REFERENCE TO RELATED APPLICATION

This application is a continuation of U.S. patent application Ser. No. 17/015,250, filed Sep. 9, 2020, now U.S. Pat. No. 11,351,792, which is a continuation of U.S. patent application Ser. No. 16/562,651, filed Sep. 6, 2019, now U.S. Pat. No. 10,773,525, which is a continuation of U.S. patent application Ser. No. 15/939,489, filed Mar. 29, 2018, now U.S. Pat. No. 10,421,284, which further claims priority from Japanese Patent Application No. 2017-189579 filed Sep. 29, 2017. The entire contents of all applications are incorporated herein by reference.

TECHNICAL FIELD

The present disclosure relates to a liquid cartridge configured to store liquid therein, and a system including the liquid cartridge, and an attachment section to which the liquid cartridge is attachable.

BACKGROUND

As a conventional system well-known in the art, there is known a system including an ink cartridge, and an inkjet-recording apparatus provided with an attachment section to which the ink cartridge is detachably attachable.

As disclosed in Japanese Patent Application Publication No. 2013-049164, an ink cartridge may be provided with a rib or other light-blocking portion, and an optical sensor may be provided in an attachment section of an inkjet-recording apparatus. When the ink cartridge is attached to the attachment section, the light-blocking portion of the ink cartridge is positioned in an optical path of the optical sensor. However, the light-blocking portion is not positioned in the optical path of the optical sensor when the ink cartridge is not mounted in the attachment section. Hence, the signal outputted by the optical sensor changes based on whether the ink cartridge is mounted in the attachment section. In this way, the inkjet-recording apparatus can determine whether the ink cartridge is attached to the attachment section depending on changes in the signal outputted from the optical sensor.

SUMMARY

However, in the above ink cartridge, the light-blocking portion constantly protrudes outward from an outer surface of a housing of the ink cartridge, although the light-blocking portion need not be detected when the ink cartridge is detached from the cartridge-attachment section. Consequently, the light-blocking portion is always susceptible to impacts from parts outside the ink cartridge and could be broken when incurring such impacts.

In view of the foregoing, it is an object of the present disclosure to provide a liquid cartridge having a light-blocking portion which is less likely to be damaged by external impacts.

In order to attain the above and other objects, the present disclosure provides a liquid cartridge configured to be inserted into a cartridge-attachment section in an insertion direction crossing a gravitational direction and accommodated in the cartridge-attachment section in an upright posture. The liquid cartridge in the upright posture includes a casing and a lever supported by the casing. The casing includes: a liquid chamber storing liquid therein; a liquid passage extending from the liquid chamber in the insertion direction; a front wall provided with the liquid passage; a rear wall positioned away from the front wall in the insertion direction, the liquid chamber being positioned between the front wall and the rear wall in the insertion direction; a top wall positioned between the front wall and the rear wall in the insertion direction; and a bottom wall positioned between the front wall and the rear wall in the insertion direction and away from the top wall in the gravitational direction, the liquid chamber being positioned between the top wall and the bottom wall in the gravitational direction. The lever is pivotable about a pivot axis between a first position and a second position. The lever includes a light-blocking portion and a force-receiving portion. The light-blocking portion is configured to block or attenuate light traveling in a widthwise direction crossing the insertion direction and the gravitational direction. The light-blocking portion is positioned lower at the second position than at the first position. The force-receiving portion is positioned closer to the front wall than the light-blocking portion is to the front wall in the insertion direction. The pivot axis is positioned frontward of the light-blocking portion and rearward of the force-receiving portion in the insertion direction. The lever pivots from the second position to the first position upon application of an external force to the force-receiving portion.

DETAILED DESCRIPTION

Figure 1:
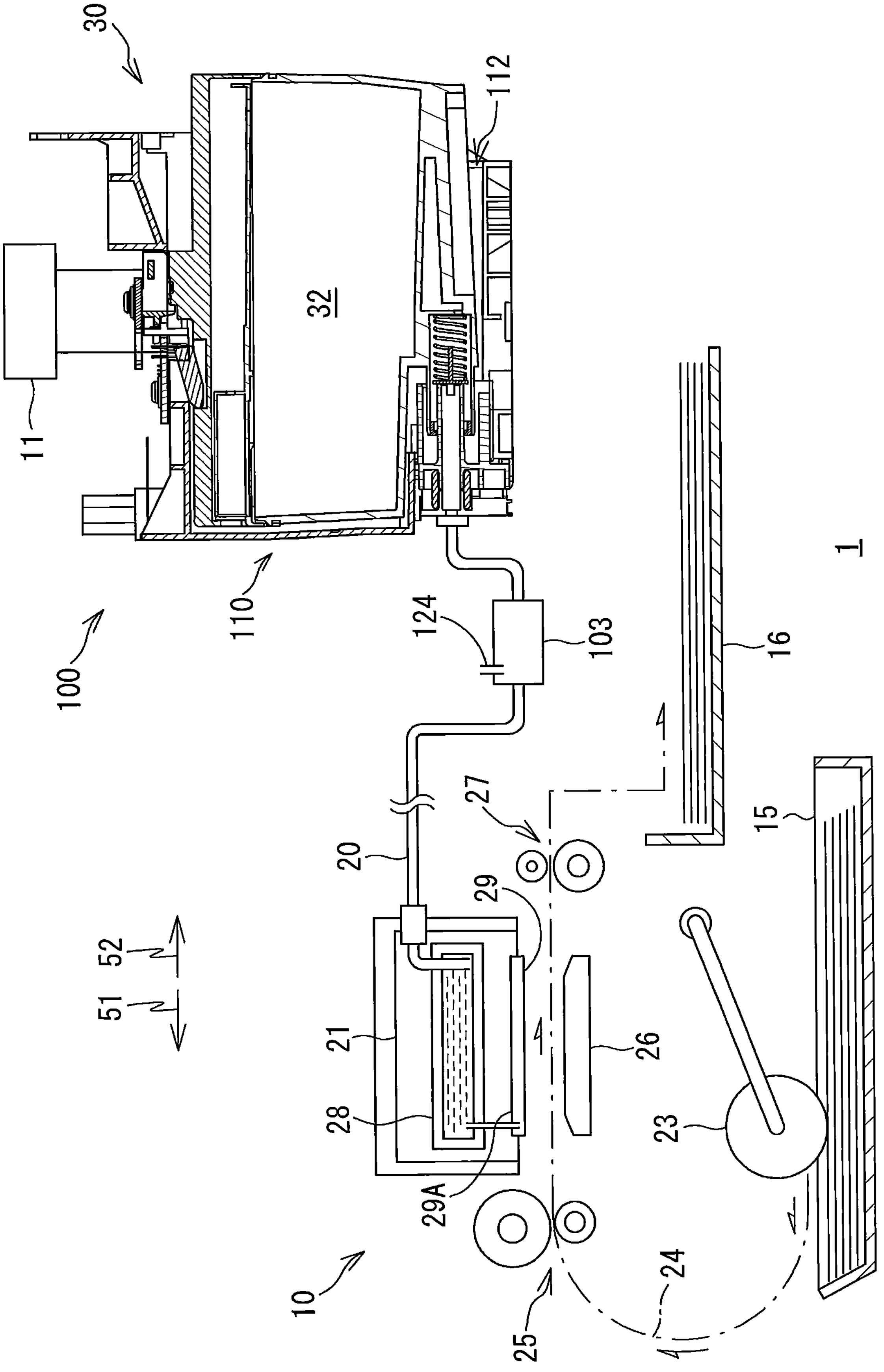
FIG. 1 is a schematic cross-sectional diagram conceptually illustrating a system including an ink cartridge according to an embodiment of the present disclosure and a printer including a cartridge-attachment section configured to detachably accommodate the ink cartridge according to the embodiment, and conceptually illustrating an internal configuration of the printer.

Hereinafter, an embodiment of the disclosure will be described in detail while referring to accompanying drawings. It would be apparent to those skilled in the art that the embodiment described below is merely an example of the present disclosure and modifications and variations may be made therein without departing from the scope of the disclosure.

In the following description, a frontward direction 51 is defined as a direction in which an ink cartridge 30 according to the embodiment is inserted into a cartridge-attachment section 110 according to the embodiment. In the present embodiment, the ink cartridge 30 is configured to be inserted in an insertion direction orthogonal to a gravitational direction. A rearward direction 52 is defined as a direction opposite the frontward direction 51, that is, a direction in which the ink cartridge 30 is extracted from the cartridge-attachment section 110. The frontward direction 51 and rearward direction 52 are horizontal in the present embodiment, i.e., are directions crossing the gravitational direction. Further, a downward direction 53 is defined as the gravitational direction, while an upward direction 54 is defined as a direction opposite the downward direction 53. Further, a rightward direction 55 and a leftward direction 56 are defined as directions orthogonal to the frontward direction 51 and the downward direction 53. More specifically, in a state where the ink cartridge 30 is attached to the cartridge-attachment section 110 (i.e., in the state illustrated in FIGS. 4-6), the rightward direction 55 is defined as a direction extending rightward and the leftward direction 56 as a direction extending leftward when the ink cartridge 30 is viewed from its rear side.

The rightward direction 55 and the leftward direction 56 are orthogonal to the frontward direction 51 and to the downward direction 53 in the present embodiment. However, the rightward direction 55 and leftward direction 56 may not necessarily be orthogonal to the frontward direction 51 and downward direction 53, provided that the rightward direction 55 and leftward direction 56 cross the frontward direction 51 and downward direction 53.

Further, in the following description, the frontward direction 51 and the rearward direction 52 may be collectively referred to as a front-rear direction. The upward direction 54 and the downward direction 53 may be collectively referred to as an up-down direction or a vertical direction. The rightward direction 55 and the leftward direction 56 may be collectively referred to as a left-right direction.

In the state where the ink cartridge 30 is completely attached to the cartridge-attachment section 110, the ink cartridge 30 has a height in the up-down direction; a depth in the front-rear direction (i.e., in the insertion direction); and a width in the left-right direction (i.e., widthwise direction).

<Overview of Printer 10>

FIG. 1 schematically illustrates a system 1 configured of the ink cartridge 30 and a printer 10 according to the embodiment. First, a detailed structure of the printer 10 will be described with reference to FIG. 1.

The printer 10 is configured to record images by selectively ejecting ink droplets onto sheets based on an inkjet recording system. The printer 10 includes an ink-supplying device 100, a recording head 21, and ink tubes 20 connecting the recording head 21 to the ink-supplying device 100. The ink-supplying device 100 includes the cartridge-attachment section 110.

Specifically, in the embodiment, the cartridge-attachment section 110 can detachably accommodate therein four of the ink cartridges 30 each storing ink of one of four colors of cyan, magenta, yellow, and black that that the printer 10 can use for printing. In FIG. 1, for the sake of simplifying description, only one ink cartridge 30 is depicted to be attached to the cartridge-attachment section 110.

The cartridge-attachment section 110 has a wall formed with an opening 112. The ink cartridges 30 can be inserted into the cartridge-attachment section 110 in the frontward direction 51 (i.e., insertion direction orthogonal to the gravitational direction) through the opening 112, and extracted from the cartridge-attachment section 110 in the rearward direction 52 (i.e., removal direction orthogonal to the gravitational direction) through the opening 112.

The ink cartridges 30 are connected to the recording head 21 through the corresponding ink tubes 20 when the ink cartridges 30 are completely mounted in the cartridge-attachment section 110.

The recording head 21 includes sub tanks 28 each serving to temporarily store ink supplied from the corresponding ink cartridge 30 through the corresponding ink tube 20. The recording head 21 also includes a plurality of nozzles 29 through which the ink supplied from the sub tanks 28 is selectively ejected in accordance with the inkjet recording system. More specifically, the recording head 21 includes a head control board (not shown), and piezoelectric elements 29A corresponding one-on-one to the nozzles 29. The head control board is configured to selectively apply drive voltages to the piezoelectric elements 29A to eject ink of each color selectively from the nozzles 29. In this way, the recording head 21 is configured to consume the ink stored in the respective ink cartridges 30 mounted in the cartridge-attachment section 110.

The printer 10 also includes a sheet tray 15, a sheet feeding roller 23, a conveying path 24, a pair of conveying rollers 25, a platen 26, a pair of discharge rollers 27, and a sheet discharge tray 16. The sheet feeding roller 23 is configured to feed each sheet from the sheet tray 15 onto the conveying path 24, and the conveying rollers 25 are configured to convey the sheet over the platen 26. The recording head 21 is configured to selectively eject ink onto the sheet as the sheet passes over the platen 26, whereby an image is recorded on the sheet. The sheet that has passed the platen 26 is then discharged by the discharge rollers 27 onto the sheet discharge tray 16 disposed at a downstream end of the conveying path 24.

<Ink-Supplying Device 100>

The ink-supplying device 100 is provided in the printer 10, as illustrated in FIG. 1. The ink-supplying device 100 functions to supply ink to the recording head 21. As described above, the ink-supplying device 100 includes the cartridge-attachment section 110 for detachably accommodate the four ink cartridges 30 therein. FIG. 1 depicts a state where the ink cartridge 30 is completely attached to the cartridge-attachment section 110 and thus can be used by the printer 10 (hereinafter, referred to as "attached state"). Note that, a posture of the ink cartridge 30 in the attached state depicted in FIG. 1 will also be referred to as an upright posture, wherever appropriate.

<Cartridge-Attachment Section 110>

Figure 2:
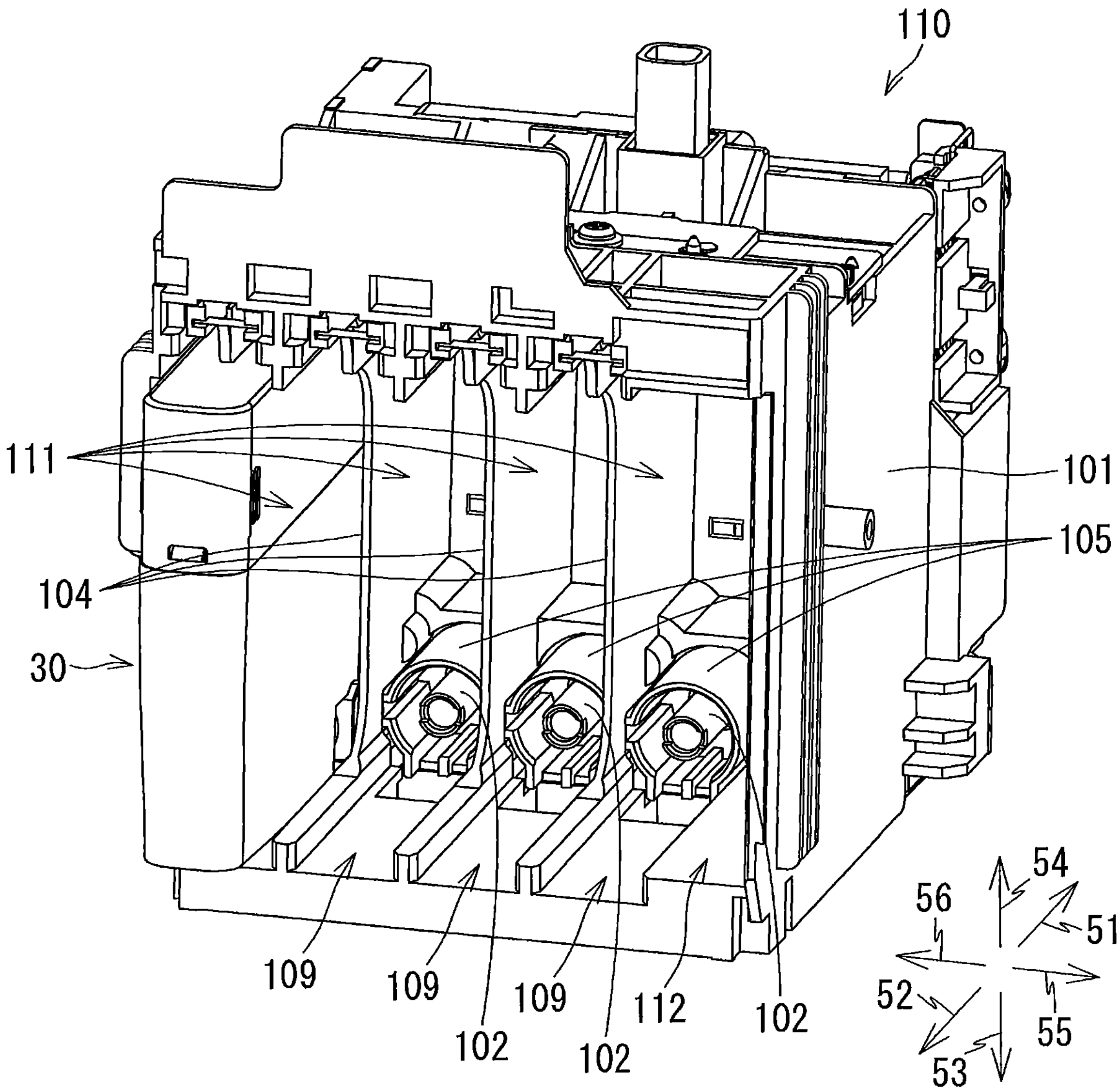
FIG. 2 is a perspective view showing an external appearance of the cartridge-attachment section according to the embodiment and an opening thereof.
Figure 3:
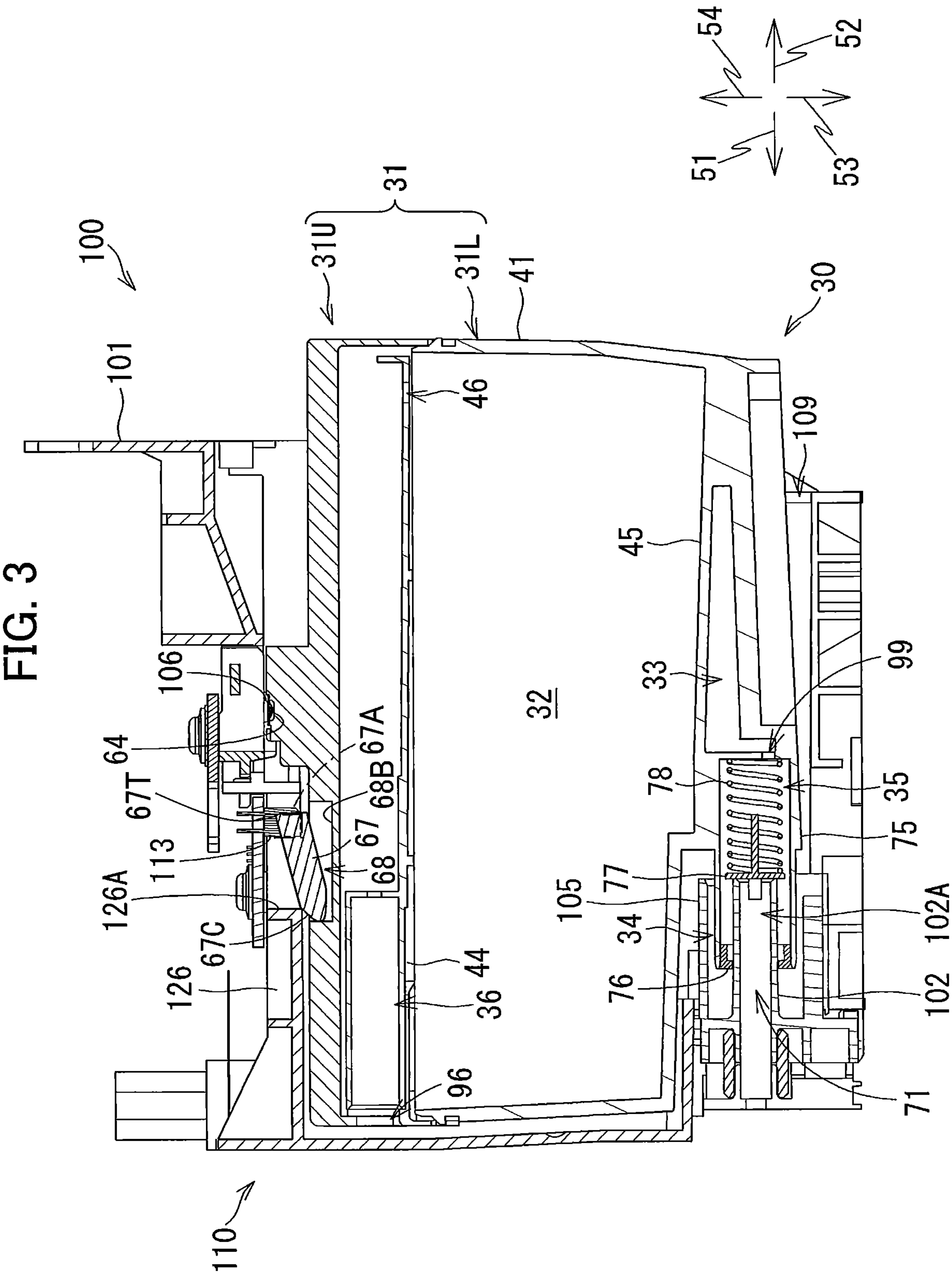
FIG. 3 is a vertical cross-sectional view of the cartridge-attachment section according to the embodiment, illustrating a state where the ink cartridge according to the embodiment is accommodated in the cartridge-attachment section and a light-blocking plate according to the embodiment is at the first position.

As illustrated in FIGS. 1 through 3, the cartridge-attachment section 110 includes a case 101, and four sets of: a projecting wall 126, an ink needle 102, a tank 103, an optical sensor 113 and four contacts 106, each set for each of the four ink cartridges 30 corresponding to the ink colors cyan, magenta, yellow, and black.

<Case 101>

The case 101 constitutes a housing of the cartridge-attachment section 110. As depicted in FIG. 2, the case 101 has a box-like shape defining an internal space therein. Specifically, the case 101 includes: a top wall defining a ceiling of the internal space; a bottom wall defining a bottom of the internal space; an end wall defining a front end of the internal space and connecting the top wall and the bottom wall; and the opening 112 positioned opposite the end wall in the front-rear direction. The opening 112 can be exposed to a surface (user-interface surface) that a user faces when using the printer 10.

The case 101 also includes three plates 104 that partition the internal space into four accommodation spaces 111 each elongated in the up-down direction. The four ink cartridges 30 can be accommodated in the respective accommodation spaces 111. That is, in the case 101, the top wall, the bottom wall and the end wall of the case 101 define ceilings, bottoms and front ends of the four accommodation spaces 111, respectively.

Each of the four ink cartridges 30 can be inserted into and removed from the corresponding one of the accommodation spaces 111 of the case 101 through the opening 112. Each of the four ink cartridges 30 can also be extracted from the corresponding one of the accommodation spaces 111 of the cartridge case 101 through the opening 112. In the case 101, the bottom wall is formed with four guide grooves 109 for guiding insertion/removal of the corresponding ink cartridges 30. Specifically, when the ink cartridges 30 are inserted into and removed from the case 101 through the opening 112, lower ends of the respective ink cartridges 30 are received in the corresponding guide grooves 109 and guided thereby in the front-rear direction.

<Ink Needle 102>

Each ink needle 102 is formed of a resin and is tubular shaped. That is, the ink needles 102 are hollow. As illustrated in FIG. 2, the ink needles 102 are disposed at a lower end portion of the end wall constituting the case 101. Specifically, each ink needle 102 is disposed on the end wall at a position corresponding to an ink supply potion 34 (described later) of the corresponding ink cartridge 30 mounted in the cartridge-attachment section 110. The ink needles 102 protrude rearward from the end wall of the case 101.

Both rear end (distal end) and front end (proximal end) of each ink needle 102 are open. The rear end of each ink needle 102 is inserted into an ink supply port 71 formed in the ink supply potion 34 of the corresponding ink cartridge 30. The front end of each ink needle 102 is either directly or indirectly connected to the corresponding ink tube 20 (see FIG. 1). Accordingly, an interior space 102A of the ink needle 102 is in communication with the corresponding tank 103 and the recording head 21 via an interior space of the corresponding ink tube 20.

As illustrated in FIGS. 2 and 3, a cylindrical-shaped guide portion 105 is provided at the end wall to surround the corresponding ink needle 102. Each guide portion 105 protrudes rearward from the end wall. Each guide portion 105 has a protruding end that is open rearward. Specifically, each ink needle 102 is arranged at a diametrical center of the corresponding guide portion 105. The guide portions 105 are shaped to allow the ink supply potions 34 of the corresponding ink cartridges 30 to be received therein.

During insertion of the ink cartridge 30 into the cartridge-attachment section 110 in the frontward direction 51, the ink supply potion 34 of the ink cartridge 30 enters into the corresponding guide portion 105 (refer to FIG. 3). As the ink cartridge 30 is inserted further forward, the ink needle 102 enters into an ink valve chamber 35 of the corresponding ink cartridge 30 through the ink supply port 71 formed in the ink supply potion 34. The ink needle 102 is thus connected to the corresponding ink supply potion 34, and the interior space 102A of the ink needle 102 is in communication with the ink valve chamber 35 formed in the ink supply potion 34. Hence, ink stored in a second storage chamber 33 formed inside the ink cartridge 30 is allowed to flow out of the second storage chamber 33, through the ink valve chamber 35 and the interior space 102A of the corresponding ink needle 102, and into the corresponding tank 103 (see FIG. 1). The ink flowing out of the tank 103 passes through the corresponding ink tube 20 and flows into the recording head 21.

Incidentally, the distal end of each ink needle 102 may be flattened or pointed. Also, the guide portions 105 may be formed into any shape, provided that the guide portions 105 can allow the ink cartridges 30 to be placed in the attached state in the cartridge-attachment section 110. Still alternatively, the guide portions 105 may be omitted from the cartridge-attachment section 110.

<Contacts 106>

As illustrated in FIG. 3, the contacts 106 are disposed at the top wall of the case 101 inside the corresponding one of the accommodation spaces 111. Four sets of the four contacts 106 are provided each set for one of the four ink cartridges 30 attachable to the case 101. The contacts 106 face downward. The contacts 106 are configured of a material having electrical conductivity and resiliency. The contacts 106 are therefore upwardly resiliently deformable. Further, although not illustrated in detail in the drawings, the four contacts 106 provided in each accommodation space 111 are aligned to be spaced apart from one another in the left-right direction. Arrangement of the four contacts 106 in each set corresponds to the arrangement of four sets of electrodes 65 of the corresponding ink cartridge 30, as will be described later. Note that the number of contacts 106 and the number of electrodes 65 may be arbitrary.

The contacts 106 are electrically connected to a controller 11 (see FIG. 1) of the printer 10 via an electric circuit. The controller 11 includes a CPU, a ROM, and a RAM, for example. By placing the contacts 106 in contact with the corresponding electrodes 65 so that electricity can be conducted therebetween, a voltage Vc is applied to the electrodes 65, the electrodes 65 are grounded, and power is supplied to the electrodes 65. Further, when electricity can be conducted between the contacts 106 and corresponding electrodes 65, data stored in an IC (integrated circuit) of the ink cartridge 30 is accessible. Output from the electric circuit is inputted into the controller 11.

<Projecting Wall 126>

As depicted in FIG. 3, the protruding walls 126 are disposed on an upper end portion of the end wall of the case 101 and protrude rearward from the same. The projecting wall 126 has a protruding end (rear end) whose rear surface 126A faces rearward. As will be described later, a light-blocking plate 67 of the ink cartridge 30 is configured to abut on the rear surface 126A during insertion of the ink cartridge 30 into the accommodation space 111 of the cartridge-attachment section 110.

<Optical Sensor 113>

The optical sensors 113 are disposed at the top wall of the case 101. Specifically, as illustrated in FIG. 3, each optical sensor 113 is disposed, for each accommodation space 111, at a position rearward of the corresponding projecting wall 126 and frontward of the corresponding set of four contacts 106. Each optical sensor 113 includes a light-emitting portion and a light-receiving portion. The light-emitting portion is arranged on the right or on the left of the light-receiving portion with a gap formed therebetween. When the ink cartridge 30 is fully attached to the cartridge-attachment section 110, a light-blocking portion 67A of the light-blocking plate 67 (described later) of the attached ink cartridge 30 is located between the light-emitting portion and the light-receiving portion of the corresponding optical sensor 113. In other words, the light-emitting portion and the light-receiving portion are arranged to oppose each other with the light-blocking portion 67A of the light-blocking plate 67 of the ink cartridge 30 fully attached to the cartridge-attachment section 110 interposed between the light-emitting portion and the light-receiving portion.

The optical sensor 113 is configured to output detection signals to the controller 11 (FIG. 1) that differ according to whether or not the corresponding light-receiving portion receives light emitted from the light-emitting portion in the left-right direction. For example, the optical sensor 113 outputs a low-level signal to the controller 11 when the light-receiving portion cannot receive the light emitted from the light-emitting portion (that is, when an intensity of the light received at the light-receiving portion is less than a predetermined intensity). On the other hand, the optical sensor 113 outputs a high-level signal when the light-receiving portion can receive the light emitted from the light-emitting portion (that is, when the intensity of the received light is equal to or greater than the predetermined intensity).

<Tank 103>

As illustrated in FIG. 1, the tanks 103 are provided forward of the case 101. Each tank 103 has a box-like shape that allows ink to be stored therein. A top portion of each tank 103 is open to the outside through an air communication port 124. Accordingly, interior spaces in the respective tanks 103 are opened to an atmosphere. The interior space of each tank 103 is in communication with the interior space 102A of the corresponding ink needle 102. With this structure, ink flowing out of the ink cartridge 30 passes through the ink needle 102 and is stored in the corresponding tank 103. Each tank 103 is also connected to the corresponding ink tube 20. Thus, the ink stored in the interior space of each tank 103 is supplied to the recording head 21 through the corresponding ink tube 20.

<Ink Cartridge 30>

Figure 4:
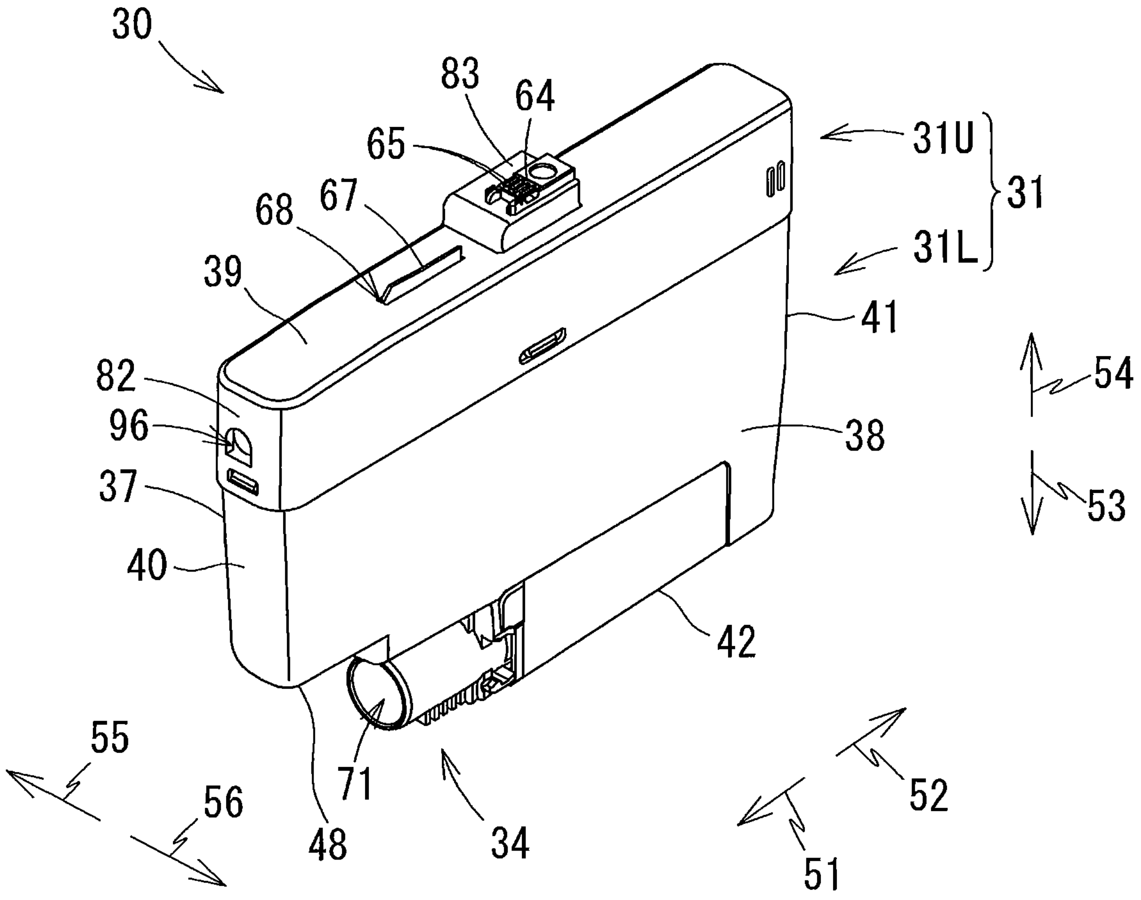
FIG. 4 is a perspective view of the ink cartridge according to the embodiment as viewed from its front side.
Figure 5B:
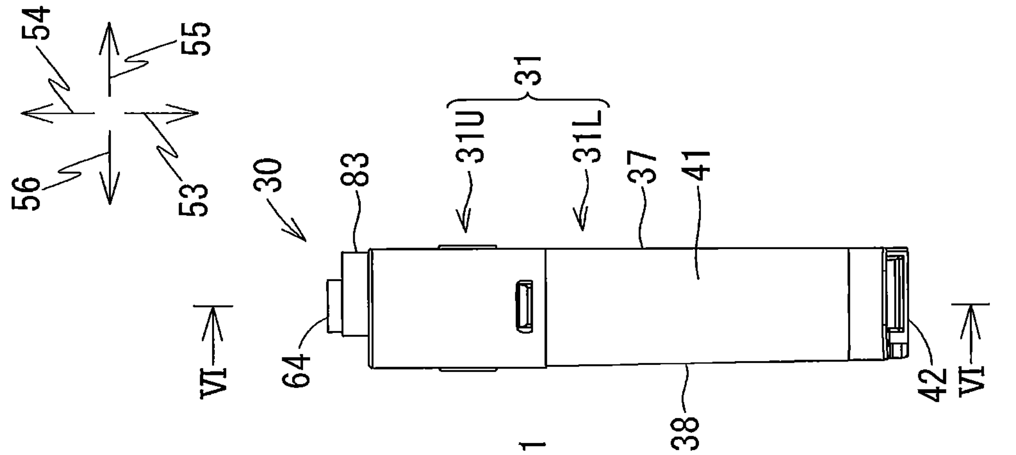
FIG. 5B is a rear side view of the ink cartridge according to the embodiment.
Figure 5A:
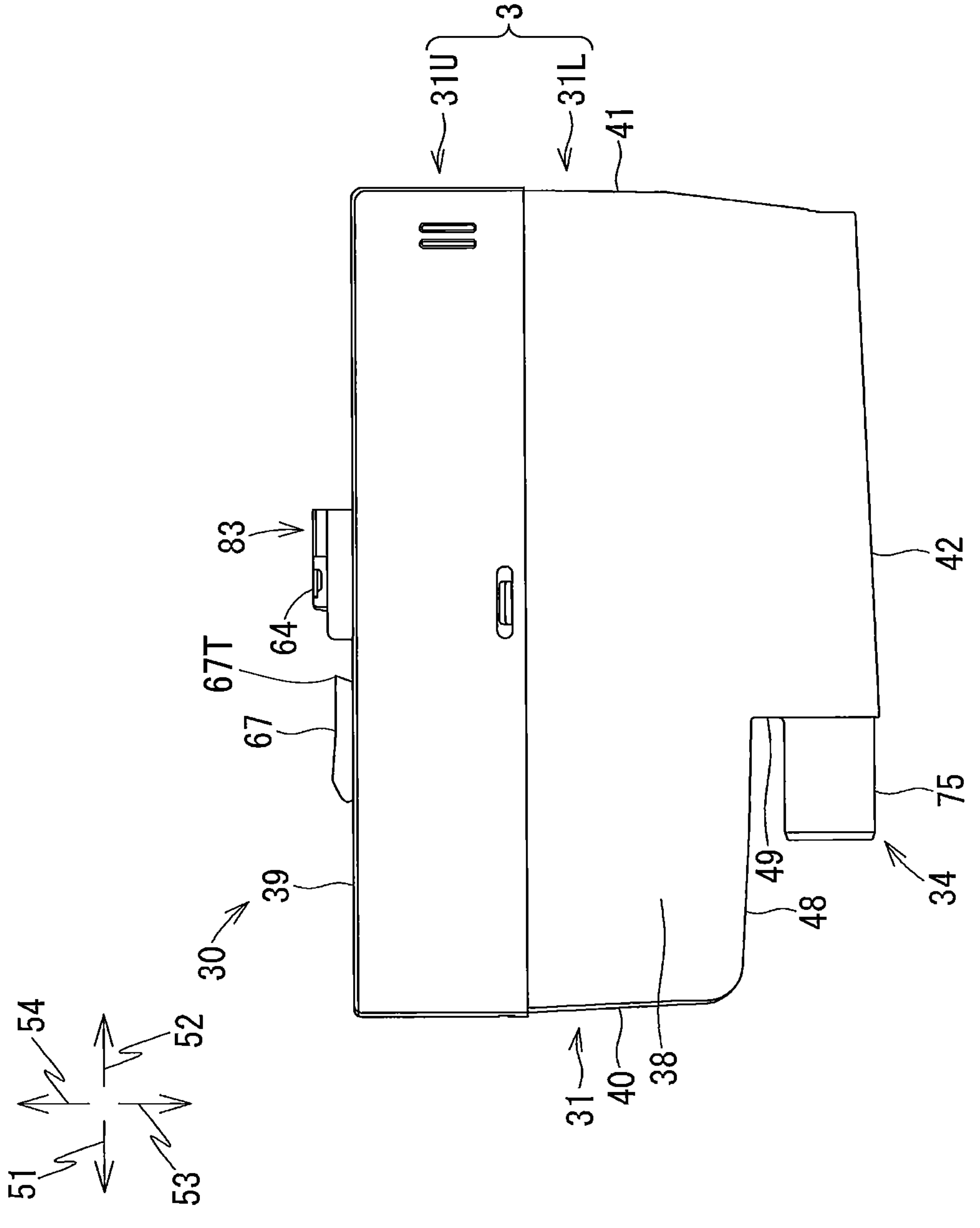
FIG. 5A is a right side view of the ink cartridge according to the embodiment.

The ink cartridge 30 depicted in FIGS. 4 to 5B is a container configured to store ink therein. In FIGS. 4 to 5B, the ink cartridge 30 is in its upright posture. That is, the ink cartridge 30 fully attached to the cartridge-attachment section 110 is in the upright posture illustrated in FIGS. 4 to 5B. The ink cartridge 30 can be therefore used in the printer 10 when in the attached state or in the upright posture. In the following description of the ink cartridge 30, up, down, front, rear, left, and right directions relative to the ink cartridge 30 are defined assuming that the ink cartridge 30 is in its upright posture.

Specifically, the ink cartridge 30 includes a casing 31. The casing 31 has a generally rectangular parallelepiped shape. The casing 31 includes a lower case 31L and an upper cover 31U. The lower case 31L defines therein a first storage chamber 32 and the second storage chamber 33 (see FIG. 6) configured to store ink. The upper cover 31U is positioned above the lower case 31L. The upper cover 31U is fitted onto the lower case 31L.

The casing 31 has an overall flattened shape in which its left-right dimension is narrow and its vertical and front-rear dimensions are greater than the left-right dimension.

The casing 31 includes a front wall 40, a rear wall 41, an top wall 39, a bottom wall 42, and a pair of side walls 37 and 38. The front wall 40 and rear wall 41 are spaced apart from each other in the front-rear direction. The top wall 39 and bottom wall 42 are separated from each other vertically. The side walls 37 and 38 are separated from each other in the left-right direction. The top wall 39 and bottom wall 42 are provided between the front wall 40 and rear wall 41 in the front-rear direction. The side walls 37 and 38 are provided between the front wall 40 and rear wall 41 in the front-rear direction and between the top wall 39 and bottom wall 42 in the up-down direction.

The front wall 40 and rear wall 41 are arranged such that the first storage chamber 32, the second storage chamber 33 and an air communication chamber 36 are interposed between the front wall 40 and rear wall 41 in the front-rear direction. The top wall 39 and bottom wall 42 are arranged such that the first storage chamber 32, second storage chamber 33 and air communication chamber 36 are interposed between the top wall 39 and bottom wall 42 in the vertical direction. The side walls 37 and 38 are arranged such that the first storage chamber 32, second storage chamber 33 and air communication chamber 36 are interposed between the side walls 37 and 38 in the left-right direction. Each of the front wall 40, rear wall 41, top wall 39, bottom wall 42, and side walls 37 and 38 defines at least one of the first storage chamber 32, second storage chamber 33, and the air communication chamber 36.

Note that, in the upright posture, a direction from the rear wall 41 toward the front wall 40 coincides with the frontward direction 51; a direction from the front wall 40 toward the rear wall 41 coincides with the rearward direction 52; a direction from the top wall 39 toward the bottom wall 42 coincides with the downward direction 53; a direction from the bottom wall 42 toward the top wall 39 coincides with the upward direction 54; a direction from the side wall 38 to the side wall 37 coincides with the rightward direction 55; and a direction from the side wall 37 to the side wall 38 coincides with the leftward direction 56.

Also, in the attached state (upright posture), the front wall 40 faces frontward; the rear wall 41 faces rearward, the bottom wall 42 faces downward, and the top wall 39 faces upward. In other words, in the upright posture of the ink cartridge 30, a front surface of the front wall 40 faces frontward, a rear surface of the rear wall 41 faces rearward, a bottom surface of the bottom wall 42 faces downward, an upper surface of the top wall 39 faces upward, a right surface of the side wall 37 faces rightward, and a left surface of the side wall 38 faces leftward.

In the casing 31, at least the rear wall 41 belonging to the lower case 31L has light-transmissive property so that a level of ink stored in the storage chambers 32 and 33 is visible from the outside.

Note that, while an outer shell of the casing 31 is configured of the lower case 31L and the upper cover 31U in the present embodiment, the casing 31 may be configured of a single box-shaped case. Further, the casing 31 may include an inner case defining the storage chambers, and an outer case constituting an outer wall that are arranged in a nested configuration with the inner case accommodated inside the outer case.

The casing 31 also includes a sub-bottom wall 48 and a sub-front wall 49. The sub-bottom wall 48 is positioned higher than the bottom wall 42. The sub-bottom wall 48 extends continuously rearward from a bottom edge of the front wall 40. In the present embodiment, a front end of the sub-bottom wall 48 is positioned farther frontward than a front end of the ink supply portion 34, and a rear end of the sub-bottom wall 48 is positioned farther rearward relative to the front end of the ink supply portion 34. The sub-front wall 49 connects the bottom wall 42 to the sub-bottom wall 48. The ink supply portion 34 extends forward from the sub-front wall 49 at a position below the sub-bottom wall 48 and above the bottom wall 42. Note that the front end of the sub-bottom wall 48 may be arranged at an arbitrary position, for example, at a position farther rearward than the front end of the ink supply portion 34.

Also note that, the front wall, rear wall, top wall, bottom wall, and side walls of the ink cartridge 30 need not each be configured of a single wall. For example, in the present embodiment, the sub-front wall 49 constitutes the front wall of the ink cartridge 30 together with the front wall 40; and the sub-bottom wall 48 constitutes the bottom wall of the ink cartridge 30 together with the bottom wall 42.

Further, the front surface of the front wall 40, rear surface of the rear wall 41, top surface of the top wall 39, bottom surface of the bottom wall 42, right surface of the side wall 37, and left surface of the side wall 38 constituting the ink cartridge 30 need not be formed as single flat surfaces, respectively.

The front surface of the front wall 40 is a surface that is visible when viewing the ink cartridge 30 in its upright posture from its front side and that is positioned forward of a front-rear center of the ink cartridge 30 in its upright posture. In the present embodiment, the front surface of the sub-front wall 49 connecting the bottom wall 42 to the sub-bottom wall 48 may be considered part of the front surface of the front wall of the ink cartridge 30 together with the front surface of the front wall 40 connecting the sub-bottom wall 48 to the top wall 39. As an alternative, the sub-bottom wall 48 may be omitted from the ink cartridge 30. In other words, the front surface of the front wall 40 may constitute a single surface continuously connecting the top wall 39 to the bottom wall 42.

Similarly, the rear surface of the rear wall 41 is a surface that is visible when viewing the ink cartridge 30 in its upright posture from its rear side and that is positioned rearward of the front-rear center of the ink cartridge 30 in its upright posture.

The upper surface of the top wall 39 is a surface that is visible when viewing the ink cartridge 30 in its upright posture from its upper side and that is positioned upward of a vertical center of the ink cartridge 30 in its upright posture.

The bottom surface of the bottom wall 42 is a surface that is visible when viewing the ink cartridge 30 in its upright posture from its bottom side and that is positioned downward of the vertical center of the ink cartridge 30 in its upright posture.

The right surface of the side wall 37 is a surface that is visible when viewing the ink cartridge 30 in its upright posture from its right side and that is positioned rightward of a left-right center of the ink cartridge 30 in its upright posture.

The left surface of the side wall 38 is a surface that is visible when viewing the ink cartridge 30 in its upright posture from its left side and that is positioned leftward of the left-right center of the ink cartridge 30 in its upright posture.

<Protruding Portion 83>

Figure 6:
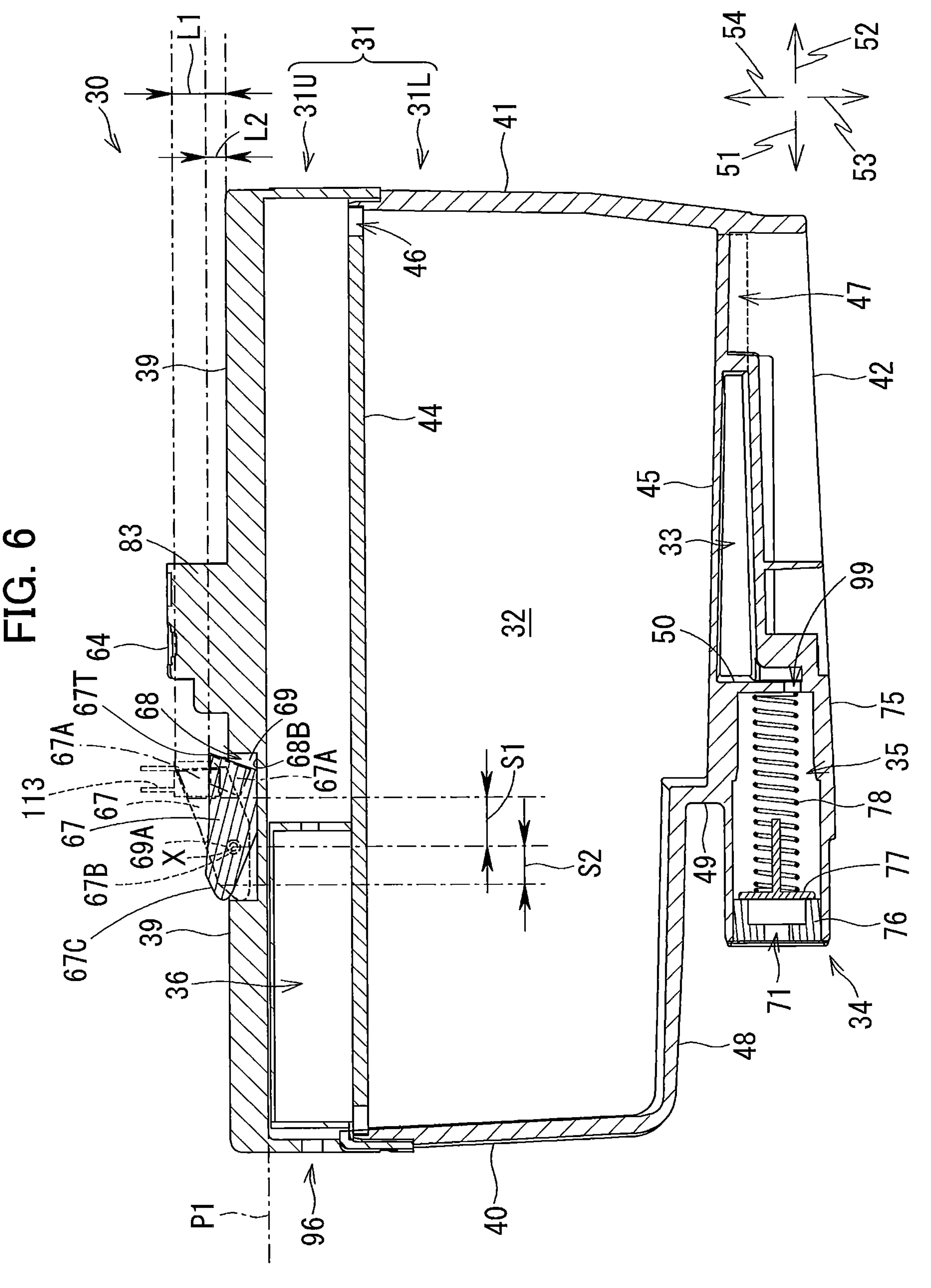
FIG. 6 is a cross-sectional view of the ink cartridge according to the embodiment taken along a plane VI-VI shown in FIG. 5B.

As depicted in FIGS. 4 to 6, a protruding portion 83 is provided on the top wall 39 of the casing 31. The protruding portion 83 protrudes upward from the top wall 39. The protruding portion 83 supports an IC board 64 thereon.

<IC Board 64>

As illustrated in FIGS. 4 to 5B, the circuit board 64 is supported on an upper surface of the protruding portion 83. The IC board 64 is arranged to face upward in the upright posture. In the upright posture, the IC board 64 is a plate extending in the left-right direction and front-rear direction.

Although not shown in detail in the drawings, the IC board 64 is bonded to the protruding portion 83 by photopolymer (photo-curable resin). Note that the IC board 64 may be bonded to the protruding portion 83 using an adhesive rather than a photopolymer or may be mounted on the protruding portion 83 through a fitting process or method other than bonding. Still alternatively, the IC board 64 may not be mounted on the protruding portion 83, but may be mounted directly on the upper surface of the top wall 39, for example.

Figure 7:
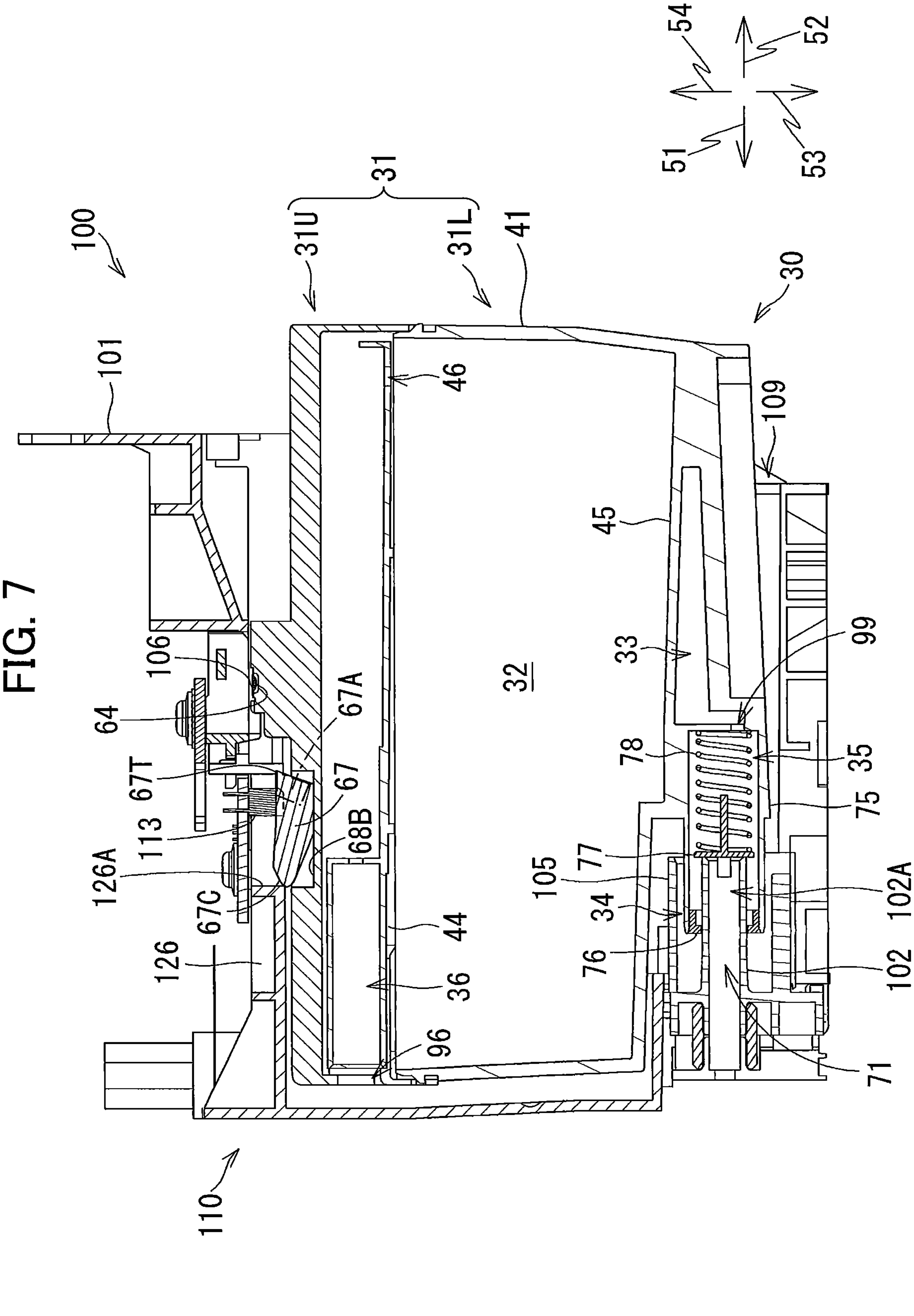
FIG. 7 is a vertical cross-sectional view of the cartridge-attachment section according to the embodiment, illustrating a state where the ink cartridge according to the embodiment is being inserted into the cartridge-attachment section and the light-blocking plate according to the embodiment is at the second position.

As shown in FIGS. 3 and 7, the circuit board 64 contacts and becomes electrically connected to the corresponding contacts 106 during the insertion of the ink cartridge 30 into the cartridge-attachment section 110. This contact and electrical connection with the contacts 106 is maintained in a state where the ink cartridge 30 is attached to the cartridge-attachment section 110.

The circuit board 64 is fabricated by mounting an IC (not illustrated in the drawings) and the four electrodes 65 on a substrate formed of a silicone or glass epoxy, for example. Note that the circuit board 64 may also be a flexible printed circuit board.

The IC is a semiconductor integrated circuit. Information related to the ink cartridge 30 can be stored on and read out from the IC. The information related to the ink cartridge 30 may include data specifying its lot number, manufactured date, ink colors used, and the like Each of the electrodes 65 is electrically connected to the IC. Each electrode 65 extends in the front-rear direction. The electrodes 65 are juxtaposed in the left-right direction on a top surface of the circuit board 64 and are spaced apart from one another. Each electrode 65 is exposed on the top surface of the circuit board 64 so as to be electrically accessible.

<Recess 68>

As illustrated in FIGS. 3, 4, 6 and 7, the casing 31 also includes a recess 68 that is open upward in the upright posture. Specifically, the recess 68 is formed in the top wall 39. That is, the recess 68 provides a space therein that is positioned below the upper surface of the top wall 39 and allows communication between the space and the atmosphere (outside of the casing 31). The recess 68 is arranged frontward and downward of the IC board 64 in the front-rear direction. The recess 68 has a shorter length in the front-rear direction than in the left-right direction.

Specifically, the recess 68 has a bottom surface 68B and a pair of side surfaces 69. The bottom surface 68B constitutes a bottom of the recess 68 and thus faces upward. The side surfaces 69 define left and right ends of the recess 68, respectively. A hole 69A is formed in each of the side surfaces 69.

<Light-Blocking Plate 67>

The light-blocking plate 67 is disposed in the recess 68 formed in the top wall 39. The light-blocking plate 67 is thus positioned frontward and downward of the IC board 64 in the present embodiment. As depicted in FIG. 6, in the upright posture, the light-blocking plate 67 is positioned above an imaginary plane P1 passing through a top edge of the interior space of the ink cartridge 30 (i.e., first storage chamber 32, second storage chamber 33 and air communication chamber 36). The light-blocking plate 67 is positioned rearward of the ink supply port 71 in the front-rear direction.

In the present embodiment, the light-blocking plate 67 is a plate-shaped member elongated in the front-rear direction. Specifically, the light-blocking plate 67 has a plate shape with a narrow dimension in the left-right direction, and dimensions in the vertical and front-rear directions that are greater than the left-right dimension. Further, the front-rear dimension of the light-blocking plate 67 is smaller than a front-rear dimension of the recess 68, and the left-right dimension of the light-blocking plate 67 is smaller than a left-right dimension of the recess 68.

As illustrated in FIG. 6, the light-blocking plate 67 includes the light-blocking portion 67A, a pair of protrusions 67B, and a force-receiving portion 67C.

The light-blocking portion 67A constitutes a rear end portion of the light-blocking plate 67. Specifically, the light-blocking portion 67A is an area enclosed by a broken line in FIG. 6 on each of left and right surfaces of the light-blocking plate 67.

In the embodiment, the light-blocking portion 67A is made of a resin containing a colored material capable of absorbing light (carbon black pigment, for example). Note that it is sufficient for only the light-blocking portion 67A of the light-blocking plate 67 to be formed of this resin, but the entire light-blocking plate 67 may be formed of the resin as well.

As a variation, a material such as aluminum foil that cannot transmit light may be affixed to a side surface of a plate through which light can be transmitted. Here, the material may be affixed to only the light-blocking portion 67A portion of the light-blocking plate 67 or may be affixed to the entire light-blocking plate 67. The material should be affixed at least to the light-blocking portion 67A in the light-blocking plate 67.

The light-blocking plate 67 is configured to block the light of the optical sensor 113 traveling in the left-right direction when the ink cartridge 30 is attached to the cartridge-attachment section 110. More specifically, when the light emitted from the light-emitting portion of the optical sensor 113 is incident on the light-blocking portion 67A before arriving at the light-receiving portion, the intensity of light received at the light-receiving portion becomes less than a predetermined intensity, for example, zero. Note that the light-blocking portion 67A may either block or attenuate the light traveling in the left-right direction from the light-emitting portion to the light-receiving portion. Alternatively, the light-blocking portion 67A may change a direction of the light traveling from the light-emitting portion to the light-receiving portion to a different direction.

Of the pair of protrusions 67B, one of the protrusions 67B protrudes rightward from the right surface of the light-blocking plate 67, while the other protrusion 67B protrudes leftward from the left surface of the light-blocking plate 67. The protrusions 67B are positioned forward of the light-blocking portion 67A and rearward of the force-receiving portion 67C. In other words, the pair of protrusions 67B is formed between the light-blocking portion 67A and force-receiving portion 67C in the front-rear direction.

The protrusions 67B are arranged coaxially on an axis X extending in the left-right direction (see FIG. 6). That is, each protrusion 67B defines a center that is positioned on the same axis X. Each of the protrusions 67B is inserted and received in the corresponding one of the holes 69A formed in the side surfaces 69 defining the recess 68. The light-blocking plate 67 is thus pivotably supported by the side surfaces 69 about the axis X passing through the centers of the protrusions 67B.

The force-receiving portion 67C constitutes a front end of the light-blocking plate 67. That is, the force-receiving portion 67C is positioned closer to the front wall 40 than the light-blocking portion 67A is to the front wall 40 in the front-rear direction. The force-receiving portion 67C is a leading end of the light-blocking plate 67 during the insertion of the ink cartridge 30 into the cartridge-attachment section 110.

The force-receiving portion 67C is a sloped surface sloping relative to the front-rear direction to extend downward toward the front. In other words, the force-receiving portion 67C is a sloped surface facing diagonally upward and frontward in the upright posture.

Specifically, the light-blocking plate 67 is pivotable about the axis X between a first position (illustrated by a broken line in FIG. 6) and a second position (illustrated by a solid line in FIG. 6).

Referring to FIG. 6, in the first position, an upper edge 67T of the light-blocking portion 67A (i.e., an upper edge of the light-blocking plate 67) protrudes upward relative to the upper surface of the top wall 39 by a first protruding length L1 in the vertical direction. Put different way, the upper edge 67T of the light-blocking portion 67A is separated upward away from the upper surface of the top wall 39 by a first distance L1 at the first position. That is, the light-blocking portion 67A is positioned separated upward away from the bottom surface 68B of the recess 68. At the first position, the upper edge 67T of the light-blocking portion 67A is located farthest away from the axis X in the up-down direction.

In the second position, the upper edge 67T of the light-blocking portion 67A (the upper edge of the light-blocking plate 67) protrudes upward relative to the upper surface of the top wall 39 by a second protruding length L2 smaller than the first protruding length L1 in the vertical direction. Put different way, the upper edge 67T of the light-blocking portion 67A is separated upward away from the upper surface of the top wall 39 by a second distance L2 smaller than the first distance L1 at the second position. At the second position, a rear end portion of the light-blocking plate 67 is in contact with the bottom surface 68B of the recess 68 and is supported by the same from below. Note that, although the light-blocking portion 67A is not in contact with the bottom surface 68B of the recess 68 at the second position in FIG. 6, the light-blocking portion 67A may be in contact with the bottom surface 68B of the recess 68 when the light-blocking plate 67 is at the second position.

Here, the "upper surface of the top wall 39" means a surface on which an upper edge of the recess 68 is defined. In case that the top wall 39 is configured of a plurality of top walls, the first protruding length L1 and second protruding length L2 (or the first distance L1 and second distance L2) relative to the top wall 39 may be determined based on an upper surface of a top wall in which the recess 68 is formed (i.e., the top wall that defines the upper edge of the recess 68).

Further, in the present embodiment, the upper edge 67T of the light-blocking portion 67A (upper edge of the light-blocking plate 67) is positioned lower than the IC board 64 at the first position, as depicted in FIG. 6.

Also referring to FIG. 6, in the first position, a distance S1 between the axis X (center of the protrusions 67B) and the light-blocking portion 67A in the front-rear direction is greater than a distance S2 between the axis X (center of the protrusions 67B) and the force-receiving portion 67C in the front-rear direction. More specifically, the distance S1 is a front-rear distance defined between the axis X and a front edge of the light-blocking portion 67A, and the distance S2 is a front-rear distance defined between the axis X and a rear edge of the force-receiving portion 67C. That is, the distance S1 represents a shortest distance between the axis X and the light-blocking portion 67A in the front-rear direction, and the distance S2 represents a shortest distance between the axis X and the force-receiving portion 67C in the front-rear direction.

In the light-blocking plate 67, a portion rearward of the protrusion 67B (axis X) is heavier than a portion frontward of the protrusion 67B (axis X). Accordingly, in a state where no external force is applied to the light-blocking plate 67, the light-blocking plate 67 is urged by its own weight to pivot clockwise in FIG. 6. As a result, without application of any external force, the light-blocking plate 67 is normally at its second position.

In the second position, the force-receiving portion 67C is located higher than the upper surface of the top wall 39. Hence, the force-receiving portion 67C can abut on the rear surface 126A of the projecting wall 126 during the insertion of the ink cartridge 30 (with the light-blocking plate 67 in the second position) into the cartridge-attachment section 110, thereby pivoting the light-blocking plate 67 into the first position from the second position. Details of the shift of the light-blocking plate 67 from the second position to the first position will be described later in detail.

<Air Communication Port 96>

As depicted in FIG. 4, an air communication port 96 is formed in an upper end portion of the front wall 40. The air communication port 96 is formed above the vertical center of the casing 31. The air communication port 96 is a substantially circular-shaped through-hole formed in the upper end portion of the front wall 40. The air communication port 96 is closed by a seal (not shown) that can be peeled off. The seal is peeled off the front wall 40 to open the air communication port 96 before the ink cartridge 30 is attached to the cartridge-attachment section 110. The first storage chamber 32 of the ink cartridge 30 is thus opened to the atmosphere. Note that the member sealing the air communication port 96 is not restricted to the seal. For example, a well-known valve mechanism may be disposed within the air communication chamber 36 to open and close the air communication port 96.

<Internal Structure of the Casing 31>

As illustrated in FIG. 6, the first ink chamber 32, the second storage chamber 33, the ink valve chamber 35 and the air communication chamber 36 are formed inside the casing 31.

Each of the first storage chamber 32, second storage chamber 33, and ink valve chamber 35 can store ink. Inside the casing 31 also provided are: an inner lower wall 45 for partitioning the first storage chamber 32 from the second storage chamber 33; and a partitioning wall 44 for partitioning the first storage chamber 32 from the air communication chamber 36. The partitioning wall 44 and inner lower wall 45 are both walls in the front-rear direction and in the left-right direction. The inner lower wall 45 and partitioning wall 44 vertically oppose each other.

That is, the first ink chamber 32 is a space that is defined on the top by the bottom surface of the partitioning wall 44, defined on the bottom by the top surface of the inner lower wall 45, and defined on the front, rear, right, and left by inner surfaces of the front wall 40, rear wall 41, and side walls 37 and 38, respectively. The partitioning wall 44 is formed with a through-hole 46 extending vertically. The through-hole 46 provides communication between the first storage chamber 32 and the air communication chamber 36.

The second storage chamber 33 is positioned below the first storage chamber 32. A volume of ink that can be stored in the second storage chamber 33 is smaller than a volume of ink that can be stored in the first storage chamber 32.

The second storage chamber 33 is a space that is defined on the top by the bottom surface of the lower wall 45, on the bottom by the top surface of the bottom wall 42, and on the rear, right, and left by the inner surfaces of the rear wall 41 and the side walls 37 and 38, respectively. A partition wall 50 is formed between the second storage chamber 33 and ink valve chamber 35. The partition wall 50 defines a front end of the second storage chamber 33. The second storage chamber 33 communicates with the first storage chamber 32 through a communication hole 47 formed in the lower wall 45 (see FIG. 6). The second storage chamber 33 also communicates with the ink valve chamber 35 via a through-hole 99 formed in the partition wall 50.

The air communication chamber 36 communicates with the atmosphere through the air communication port 96 formed in the front wall 40.

The ink supply potion 34 has a cylindrical outer shape. More specifically, the ink supply portion 34 includes a hollow cylindrical-shaped cylinder 75, and a packing 76. The cylinder 75 protrudes forward from the sub-front wall 49. That is, the ink supply portion 34 is provided on the sub-front wall 49. The cylinder 75 has a front end that is open to the outside of the ink cartridge 30. The cylinder 75 defines an interior space therein that serves as the ink valve chamber 35. The ink valve chamber 35 is a space elongated in the front-rear direction when the ink cartridge 30 is in the upright posture. The rear end of the ink valve chamber 35 is in communication with the second storage chamber 33 through the through-hole 99. Since the front end of the cylinder 75 is open to the exterior of the ink cartridge 30, the ink valve chamber 35 is in communication with both the second storage chamber 33 and the exterior of the ink cartridge 30. In other words, the ink valve chamber 35 extends in the front-rear direction to allow ink in the second storage chamber 33 to flow forward toward the outside of the ink cartridge 30. The packing 76 is provided in the open front end of the cylinder 75. That is, the packing 76 is disposed at the front end of the ink valve chamber 35.

The ink valve chamber 35 accommodates a valve 77, and a coil spring 78. By moving in the front-rear direction, the valve 77 opens and closes the ink supply port 71 penetrating a center of the packing 76. The coil spring 78 urges the valve 77 forward. Therefore, when no external force is applied to the valve 77, the valve 77 closes the ink supply port 71 in the packing 76.

The packing 76 is a disk-shaped member with a through-hole formed in the center potion thereof. The packing 76 is formed of an elastic material such as a rubber or elastomer. The through-hole formed in the center of the packing 76 penetrates the same in the front-rear direction to provide a tubular-shaped inner circumferential surface serving as the ink supply port 71. That is, the ink supply port 71 is defined by the tubular-shaped inner circumferential surface that defines the through-hole formed in the packing 76. The ink supply port 71 has an inner diameter that is slightly smaller than an outer diameter of the ink needle 102. The ink supply port 71 provides communication between the interior space of the cylinder 75 (the ink valve chamber 35) and the exterior of the ink cartridge 30.

When the ink cartridge 30 is inserted into the cartridge-attachment section 110 while the valve 77 is closing the ink supply port 71, the ink needle 102 advances into the ink supply port 71, as depicted in FIG. 7. As the packing 76 elastically deforms, the outer circumferential surface of the ink needle 102 forms close contact with the inner circumferential surface defining the ink supply port 71 to provide liquid-tight seal therewith. In other words, communication between the ink valve chamber 35 and the exterior of the ink cartridge 30 via the ink supply port 71 is hermetically sealed. Subsequently, the distal end of the ink needle 102 passes through the ink supply port 71 formed in the packing 76, advances into the ink valve chamber 35, and contacts the valve 77. As the ink cartridge 30 is further inserted into the cartridge-attachment section 110, the ink needle 102 moves the valve 77 rearward against an urging force of the coil spring 78. As a result, ink stored in the ink valve chamber 35 is allowed to flow into the interior space 102A of the ink needle 102.

Note that the ink supply port 71 may be sealed by a film rather than the valve 77. In this case, the ink supply port 71 may be configured of the open front end of the cylinder 75 rather than the packing 76. Alternatively, the ink supply port 71 may be formed of an elastic resin or other sealing member that has no through-hole. In this case, the ink supply port 71 may be formed by piercing a needle-like member into the sealing member, and elasticity of the sealing member can reseal the ink supply port 71 when the needle-like member is extracted from the sealing member. Further, the ink supply portion 34 need not be formed as a cylindrically shaped member. For example, a through-hole may be formed in the front wall 40 of the casing 31 to penetrate the front wall 40 in the front-rear direction. In this case, the front wall 40 formed with the through-hole may constitute a portion of the ink supply portion 34.

[Attachment/Detachment of the Ink Cartridge 30 relative to the Cartridge-Attachment Section 110]

Next, a process for attaching the ink cartridge 30 to the cartridge-attachment section 110 will be described.

As depicted in FIG. 6, the valve 77 closes the ink supply port 71 formed in the packing 76 prior to attachment of the ink cartridge 30 to the cartridge-attachment section 110. This closure interrupts ink outflow from the ink valve chamber 35 to the exterior of the ink cartridge 30. Further, the air communication port 96 is sealed by the removable seal (not shown). Thus the first storage chamber 32 is prevented from being open to the atmosphere.

Also, prior to attachment to the cartridge-attachment section 110, the light-blocking plate 67 is in the second position, as illustrated in FIG. 6.

Before insertion of the ink cartridge 30 into the cartridge-attachment section 110, the user peels off the seal from the air communication port 96. The first storage chamber 32 is opened to the atmosphere accordingly.

For attaching the ink cartridge 30 to the cartridge-attachment section 110, the user inserts the ink cartridge 30 in its upright posture into the case 101 (see FIG. 2) through the opening 112 of the cartridge-attachment section 110. The user pushes against the rear wall 41 of the casing 31 forward to insert the ink cartridge 30 into the cartridge-attachment section 110. The lower portion of the ink cartridge 30 advances in the corresponding guide groove 109 formed in the bottom of the case 101 (see FIG. 2).

As the ink cartridge 30 is inserted into the cartridge-attachment section 110, the ink supply portion 34 advances into the corresponding guide portion 105; and the ink needle 102 passes through the ink supply port 71 and enters the ink valve chamber 35, forcing the valve 77 to separate from the packing 76 against the urging force of the coil spring 78. Through this action, the ink supply portion 34 is fixed in position. The ink stored in the ink valve chamber 35 is thus allowed to flow into the interior space 102A of the ink needle 102.

Also, as the ink cartridge 30 is inserted into the cartridge-attachment section 110, the rear surface 126A of the projecting wall 126 is brought into contact with the force-receiving portion 67C of the light-blocking plate 67 in the second position from its front side.

As the ink cartridge 30 is inserted further forward against the urging force of the coil spring 78 from the state depicted in FIG. 7 to reach the state depicted in FIG. 3 (attached state: in a state where the front wall 40 has approached close to the end wall of the case 101), the rear surface 126A of the projecting wall 126 pushes the force-receiving portion 67C of the force-receiving portion 67C in the second position rearward, while guiding the force-receiving portion 67C to move downward along the slope of the force-receiving portion 67C. The light-blocking plate 67 at the second position is thus caused to pivot counterclockwise in FIG. 7 into the first position. In this way, during the insertion of the ink cartridge 30 into the cartridge-attachment section 110, the light-blocking plate 67 is pivoted from the second position to the first position by the abutment of the force-receiving portion 67C against the projecting wall 126 (by application of rearward external force onto the force-receiving portion 67C).

In the attached state of the ink cartridge 30 depicted in FIG. 3, the ink cartridge 30 is applied with rearward urging force generated by the compressed coil spring 78. However, in the present embodiment, a sliding resistance between the ink needle 102 inserted into the ink supply port 71 and the inner circumferential surface of the packing 76 (forward force) is greater than this rearward urging force (rearward force). Hence, the ink cartridge 30 is prevented from being forced out of the cartridge-attachment section 110 by the urging force of the coil spring 78. As a result, the ink cartridge 30 can be retained in its attached state in the cartridge-attachment section 110.

Referring to FIG. 3, when the ink cartridge 30 is in the attached state, the circuit board 64 becomes positioned below the contacts 106. The electrodes 65 on the circuit board 64 are in contact with the corresponding contacts 106 while resiliently deform the contacts 106 upward. Hence, in the attached state, an electrical connection is established between the circuit board 64 and contacts 106.

Further, in the attached state, the light-blocking portion 67A of the light-blocking plate 67 at the first position is positioned between the light-emitting portion and light-receiving portion of the optical sensor 113. As a result, in the attached state, the light-blocking portion 67A of the light-blocking plate 67 at the first position is positioned in the optical path of light emitted from the light-emitting portion of the optical sensor 113.

Accordingly, in the attached state, the light-blocking portion 67A of the light-blocking plate 67 at its first position can be detected by the optical sensor 113 since the light-blocking portion 67A blocks passage of the light emitted from the optical sensor 113 when the light-blocking plate 67 is at the first position. If the light-blocking plate 67 is at its second position in the attached state of the ink cartridge 30, the light from the optical sensor 113 cannot be blocked by the light-blocking portion 67A, since the light-blocking portion 67A is located below the optical sensor 113 (the light-blocking portion 67A is not positioned between the light-emitting portion and light-receiving portion of the optical sensor 113).

To remove the ink cartridge 30 from the cartridge-attachment section 110, the user grips the rear portion of the ink cartridge 30 and pulls the ink cartridge 30 rearward. When a sum of the force pulling the ink cartridge 30 rearward and the urging force of the coil spring 78 (rearward force) is greater than the sliding friction between the ink needle 102 and the inner circumferential surface of the packing 76 (forward force), the ink cartridge 30 moves rearward relative to the cartridge-attachment section 110. At this time, the user can remove the ink cartridge 30 from the cartridge-attachment section 110.

[Detection on whether the Ink Cartridge 30 is attached to the Cartridge-Attachment Section 110]

Next, operations for detecting the ink cartridge 30 being inserted in the cartridge-attachment section 110 will be described with reference to flowcharts in FIGS. 8 and 9.

Figure 8:
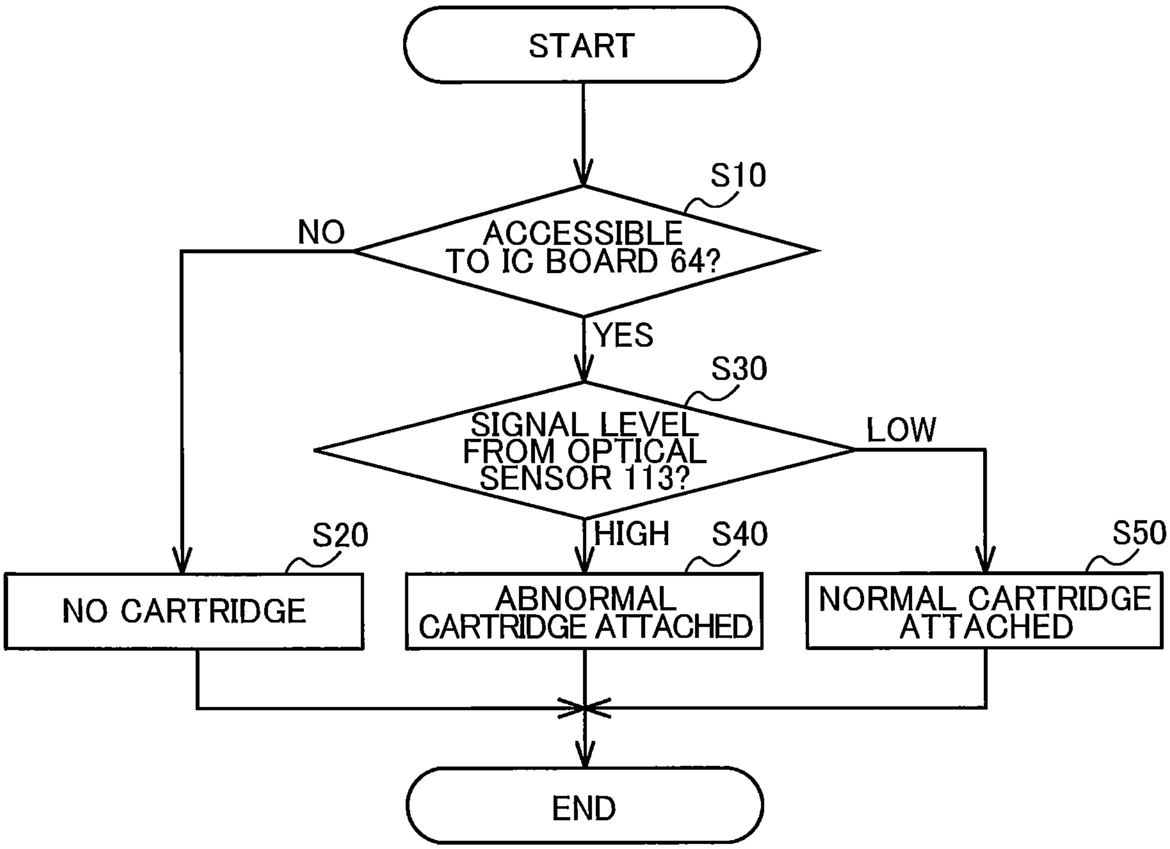
FIG. 8 is a flowchart illustrating steps for detecting insertion of the ink cartridge according to the embodiment into the cartridge-attachment section according to the embodiment.
Figure 9:
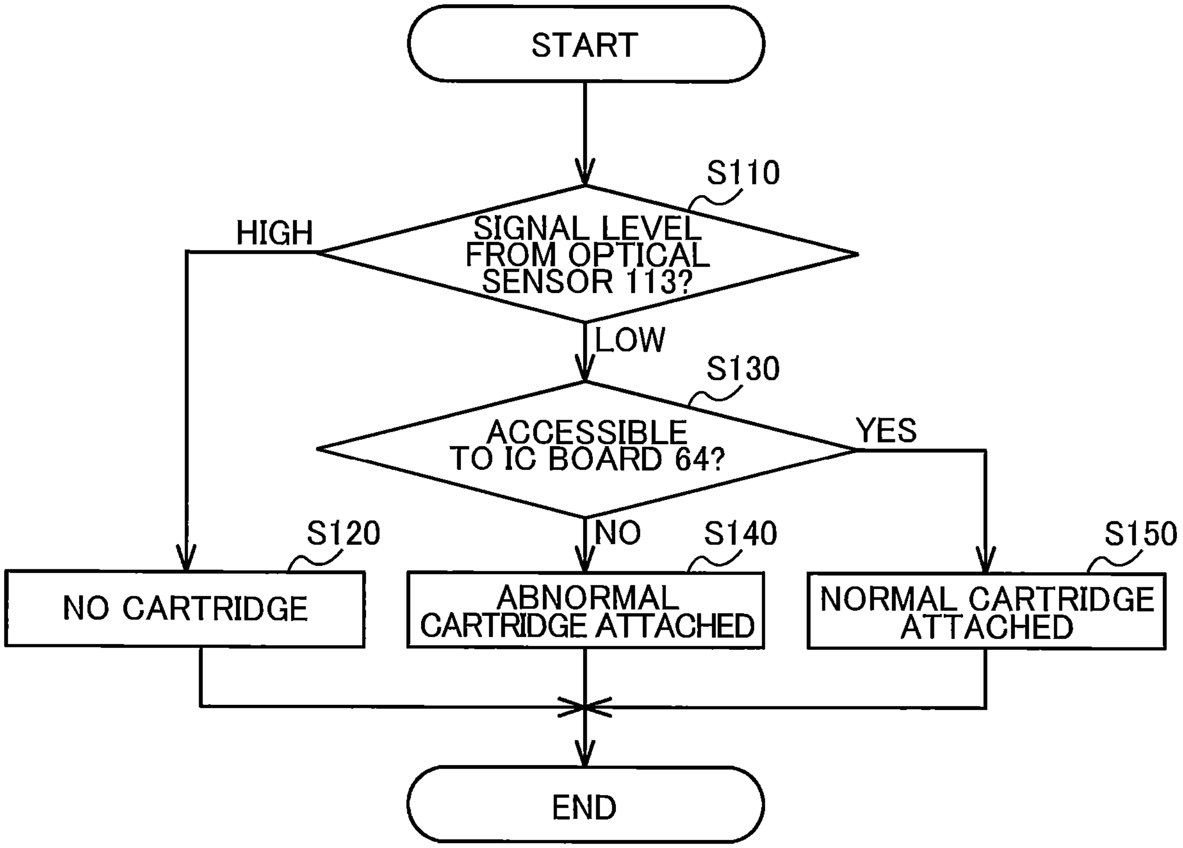
FIG. 9 is a flowchart illustrating another way of detecting insertion of the ink cartridge according to the embodiment into the cartridge-attachment section according to the embodiment.

Note that the controller 11 is configured to start the processing illustrated in the flowcharts in FIGS. 8 and 9 once a cover (not shown) for opening and closing the opening 112 of the cartridge-attachment section 110 is detected to be closed.

First, steps of the flowchart in FIG. 8 will be described.

Referring to FIG. 8, once detecting that the cover (not shown) is closed, the controller 11 (see FIG. 1) is configured to determine in S10 whether the circuit board 64 of the ink cartridge 30 is accessible. When the contacts 106 are in contact with the circuit board 64 so as to be electrically connected to the same, the controller 11 can access the circuit board 64. When the contacts 106 are not in contact with the circuit board 64, the controller 11 cannot access the circuit board 64.

If the controller 11 cannot access the circuit board 64 (S10: NO), in S20 the controller 11 determines that the ink cartridge 30 is not mounted in the cartridge-attachment section 110. In this case, the controller 11 notifies the user that an ink cartridge 30 is not mounted by displaying a message on a display panel (not shown) provided on a housing of the printer 10 and/or emitting a beep or other sound from a speaker (not shown).

However, if the controller 11 can access the circuit board 64 (S10: YES), in S30 the controller 11 then determines whether the signal outputted from the optical sensor 113 is high level or low level. When the light-blocking portion 67A of the light-blocking plate 67 is positioned between the light-emitting portion and light-receiving portion of the optical sensor 113, the optical sensor 113 outputs a low level signal to the controller 11. When the light-blocking portion 67A of the light-blocking plate 67 is not positioned between the light-emitting portion and light-receiving portion of the optical sensor 113, the optical sensor 113 outputs a high level signal to the controller 11.

If the signal outputted from the optical sensor 113 to the controller 11 is the high level (S30: HIGH), in S40 the controller 11 determines that an abnormal ink cartridge 30 is mounted in the cartridge-attachment section 110. In this case, the controller 11 notifies the user that an abnormal ink cartridge 30 is mounted by displaying a message on the display panel (not shown) provided on the housing of the printer 10 and/or plays a beep or other sound from the speaker (not shown).

On the other hand, if the signal outputted by the optical sensor 113 is the low level (S30: LOW), in S50 the controller 11 determines that a normal ink cartridge 30 is mounted in the cartridge-attachment section 110.

In the flowchart of FIG. 8, the controller 11 determines whether an ink cartridge 30 is mounted in the cartridge-attachment section 110 based on whether the circuit board 64 is accessible, and determines whether the ink cartridge 30 mounted in the cartridge-attachment section 110 is normal based on the level of signal outputted from the optical sensor 113.

However, the controller 11 may be configured to determine whether an ink cartridge 30 is mounted in the cartridge-attachment section 110 based on the level of the signal outputted from the optical sensor 113, and to determine whether the ink cartridge 30 mounted in the cartridge-attachment section 110 is normal based on whether the circuit board 64 is accessible. Steps in this variation will be described next with reference to the flowchart in FIG. 9.

Referring to FIG. 9, in S110 the controller 11 determines whether the signal outputted by the optical sensor 113 to the controller 11 is the high level or low level.

If the signal outputted by the optical sensor 113 is the high level (S110: HIGH), in S120 the controller 11 determines that an ink cartridge 30 is not mounted in the cartridge-attachment section 110. In this case, as in S20 of FIG. 8, the controller 11 notifies the user that an ink cartridge 30 is not mounted.

However, if the signal outputted by the optical sensor 113 is the low level (S110: LOW), in S130 the controller 11 determines whether the circuit board 64 of the ink cartridge 30 is accessible.

If the controller 11 cannot access the circuit board 64 (S130: NO), in S140 the controller 11 determines that an abnormal ink cartridge 30 is mounted in the cartridge-attachment section 110. In this case, as in S40 of FIG. 8, the controller 11 notifies the user that an abnormal ink cartridge 30 is mounted.

On the other hand, if the controller 11 can access the circuit board 64 (S130: YES), in S150 the controller 11 determines that a normal ink cartridge 30 is mounted in the cartridge-attachment section 110.

[Operational and Technical Advantages of the Embodiment]

In the depicted embodiment, the light-blocking plate 67 is at the second position lower than the first position while no external force is being applied to the light-blocking plate 67. Thus, the configuration of the present embodiment can reduce a potential for the light-blocking plate 67 to incur impacts from external objects, compared to a case where the light-blocking plate 67 is at the first position when no external force is applied thereto; or compared to a case where the light-blocking plate 67 is immovable and always protrudes upward relative to the top wall 39 (remains at the first position) regardless of application of external force to the light-blocking plate 67. Thus, this configuration of the embodiment reduces the potential for damage to the light-blocking plate 67.

In the depicted embodiment, the light-blocking plate 67 can be moved from the second position to the first position by the abutment of the force-receiving portion 67C of the light-blocking plate 67 against the rear surface 126A of the projecting wall 126 of the cartridge-attachment section 110 during the insertion of the ink cartridge 30 into the cartridge-attachment section 110. This configuration can ensure that the light-blocking plate 67 is located at the first position when the ink cartridge 30 is completely mounted in the cartridge-attachment section 110. Hence, in the attached state, light emitted from an external unit can more easily be incident on the light-blocking portion 67A.

In the depicted embodiment, the rear surface 126A of the projecting wall 126 provided in the cartridge-attachment section 110 is configured to contact the force-receiving portion 67C of the light-blocking plate 67 from its front side. Accordingly, as the ink cartridge 30 is inserted forward relative to the cartridge-attachment section 110 to be mounted therein, the light-blocking plate 67 can be reliably moved from the second position to the first position.

In the depicted embodiment, a member provided in the cartridge-attachment section 110 for the purpose of accessing the force-receiving portion 67C during the insertion of the ink cartridge 30 into the cartridge-attachment section 110 (i.e., the projecting wall 126) can be positioned higher than the top wall 39, i.e., can be arranged in an area outside the interior space of the ink cartridge 30. That is, the projecting wall 126 is positioned above a liquid storage chamber in the ink cartridge 30 (the first storage chamber 32, second storage chamber 33, and ink valve chamber 35). Accordingly, this arrangement of the embodiment can maximize the ratio of the interior space to the overall ink cartridge 30.

In the depicted embodiment, the force-receiving portion 67C is formed as a sloped surface so that the rear surface 126A of the projecting wall 126 (the portion of the cartridge-attachment section 110 coming into contact with the force-receiving portion 67C) can be guided over the force-receiving portion 67C. With this configuration, during the insertion of the ink cartridge 30 into the cartridge-attachment section 110, a portion of the light-blocking plate 67 rearward of the axis X of the protrusions 67B (i.e., a rearward portion including the light-blocking portion 67A) moves upward, while a portion forward of the axis X of the protrusions 67B (i.e., a forward portion including the force-receiving portion 67C) moves downward. In other words, the light-blocking plate 67 pivots from the second position to the first position during the insertion of the ink cartridge 30 into the cartridge-attachment section 110.

In the depicted embodiment, the rearward portion of the light-blocking plate 67 positioned rearward of the pivot axis X (protrusions 67B) is heavier than the forward portion of the light-blocking plate 67 positioned forward of the pivot axis X (protrusions 67B). Consequently, the light-blocking plate 67 is maintained at the second position by its own weight when an external force is not being applied to the light-blocking plate 67.

As illustrated in FIG. 6, when the light-blocking plate 67 is at the first position, the shortest distance S1 between the axis X and the light-blocking portion 67A (a front-rear dimension of the portion of the light-blocking plate 67 from the axis X to the light-blocking portion 67A) is greater than the shortest distance S2 between the axis X and force-receiving portion 67C (a front-rear dimension of the portion of the light-blocking plate 67 from the axis X to the force-receiving portion 67C). Accordingly, with this structure of the embodiment, a configuration for maintaining the light-blocking plate 67 at the second position by its own weight can be easily implemented.

In the embodiment, the light-blocking plate 67 is positioned above the imaginary plane P1 (see FIG. 6) passing through the top edge of the interior space in the ink cartridge 30 (the first storage chamber 32, second storage chamber 33, and air communication chamber 36). This arrangement can prevent the presence of the light-blocking plate 67 from reducing the capacity of the first storage chamber 32, second storage chamber 33, and air communication chamber 36. In other words, this arrangement can prevent the presence of the light-blocking plate 67 from reducing the quantity of liquid that the ink cartridge 30 can store.

Further, when the light-blocking plate 67 is at the first position, the force-receiving portion 67C is positioned above the upper surface of the top wall 39 in the embodiment. With this structure, there is no need to form a space beneath the top wall 39 for accommodating the force-receiving portion 67C therein, enlarging the interior space (liquid chamber) in the casing 31.

In the depicted embodiment, the light-blocking plate 67 is positioned farther rearward than the ink supply port 71 in the insertion direction (front-rear direction). This arrangement of the embodiment can easily configure the ink cartridge 30 such that, during the insertion of the ink cartridge 30 into the cartridge-attachment section 110, the light-blocking plate 67 moves to the first position after the ink supply port 71 becomes connected to the ink needle 102 and the like provided in the cartridge-attachment section 110.

In the depicted embodiment, the circuit board 64 is disposed farther rearward and higher than the light-blocking portion 67A of the light-blocking plate 67 at the second position. With this configuration, the optical sensor 113 and the like provided in the cartridge-attachment section 110 for irradiating light onto the light-blocking portion 67A can be prevented from contacting the circuit board 64 as the ink cartridge 30 is inserted into the cartridge-attachment section 110.

In the depicted embodiment, the light-blocking plate 67 as a whole is positioned lower than the circuit board 64 not only when at the first position but also when at the second position. This arrangement allows the vertical dimension of the ink cartridge 30 to be made shorter than in a configuration in which the light-blocking plate 67 is positioned higher than the circuit board 64.

[Variations and Modifications]

In the following, various modifications to the depicted embodiments will be described. Like parts and components will be designated with the same reference numerals as those of the depicted embodiment to avoid duplicating explanation.

In the depicted embodiment, the force-receiving portion 67C of the light-blocking plate 67 is a sloped surface that faces diagonally upward and forward in the upright posture. However, the force-receiving portion 67C is not limited to this type of sloped surface. That is, light-blocking plate 67 need not be provided with a sloped surface.

Figure 10:
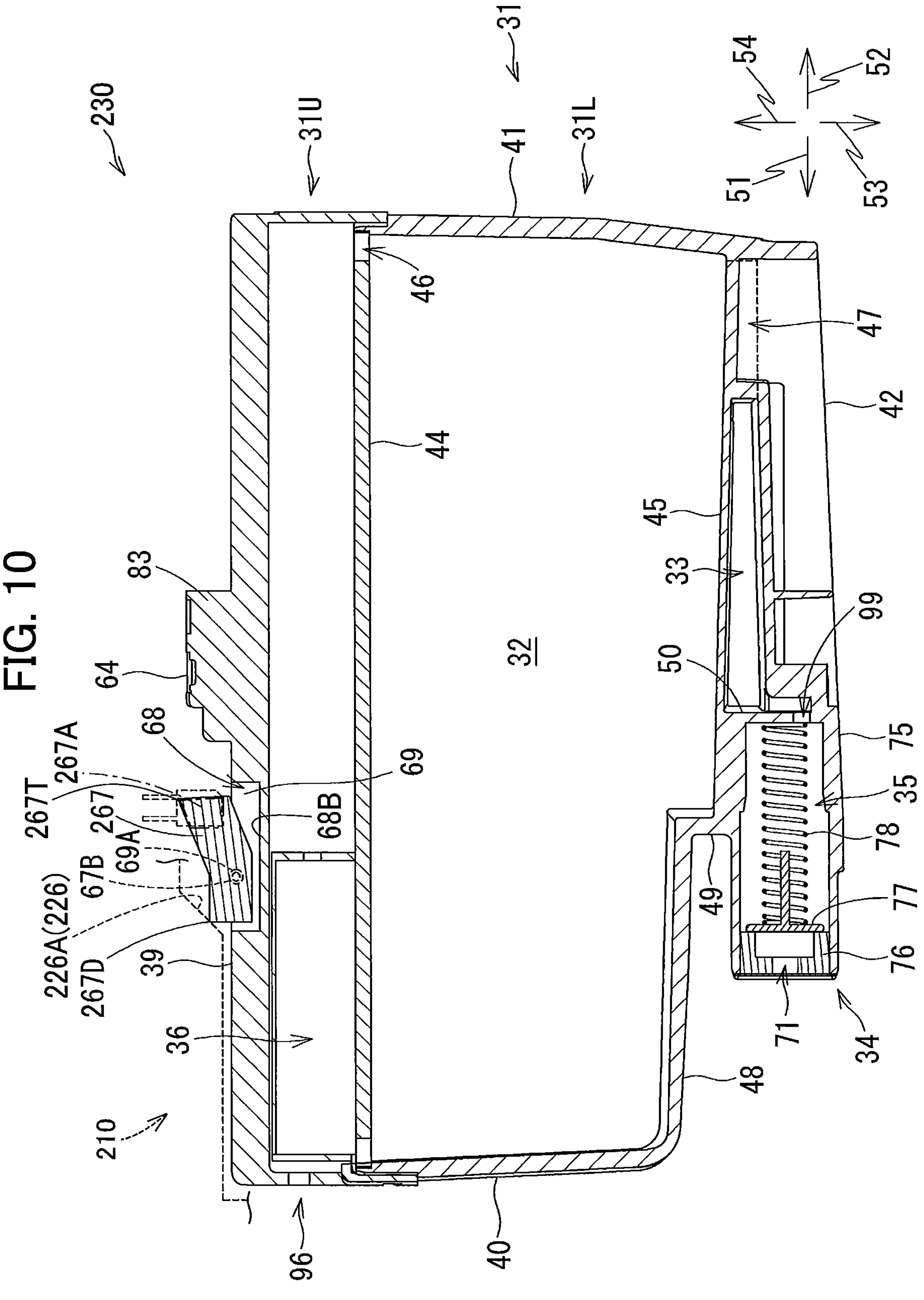
FIG. 10 is a vertical cross-sectional view of a cartridge-attachment section according to a first modification to the embodiment, illustrating a state where an ink cartridge according to the first modification is attached to the cartridge-attachment section and a light-blocking plate according to the first modification is at its first position.

As an example, FIG. 10 illustrates an ink cartridge 230 provided with a light-blocking plate 267 according to a first modification to the embodiment. In this modification, the light-blocking plate 267 does not have a sloped surface, but, instead, a projecting wall 226 of a cartridge-attachment section 210 has a sloped rear surface 226A facing diagonally downward and rearward. The light-blocking plate 267 has a front end portion having a cornered upper-front edge. In the configuration shown in FIG. 10, the cornered upper-front edge of the light-blocking plate 267 serves as a force-receiving portion 267D and is configured to contact the sloped rear surface 226A of the projecting wall 226. As the ink cartridge 230 is inserted forward into the cartridge-attachment section 210 in the structure shown in FIG. 10, the force-receiving portion 267D of the light-blocking plate 267 is guided along the rear surface 226A of the projecting wall 226, forcing the light-blocking plate 267 to pivot from the second position to the first position. Note that FIG. 10 shows the state in which the light-blocking plate 267 is in its first position.

Note that, as in the embodiment, the light-blocking plate 267 is pivoted to move from the second position to the first position by the abutment of the force-receiving portion 267D against the sloped rear surface 226A of the projecting wall 226 during the insertion of the ink cartridge 230 into the cartridge-attachment section 210. However, contrary to the embodiment, a light-blocking portion 267A of the light-blocking plate 267 is positioned higher than the IC board 64 when the light-blocking plate 267 is in the first position as depicted in FIG. 10. That is, an upper edge 267T of the light-blocking portion 267A of the light-blocking plate 267 at the first position is positioned above the IC board 64. Hence, when the ink cartridge 230 is attached to the cartridge-attachment section 210, the contacts 106 of the cartridge-attachment section 210 are positioned below the upper edge 267T of the light-blocking portion 267A of the light-blocking plate 267 at the first position. However, even with this structure of the first modification, the light-blocking portion 267A does not interfere with the contacts 106 of the cartridge-attachment section 210 during the insertion of the ink cartridge 230 into the cartridge-attachment section 210, since the light-blocking plate 267 is pivoted from the second position to the first position after the light-blocking plate 267 at the second position moves past the contacts 106 in the insertion direction (see FIG. 7 of the embodiment).

Figure 11:
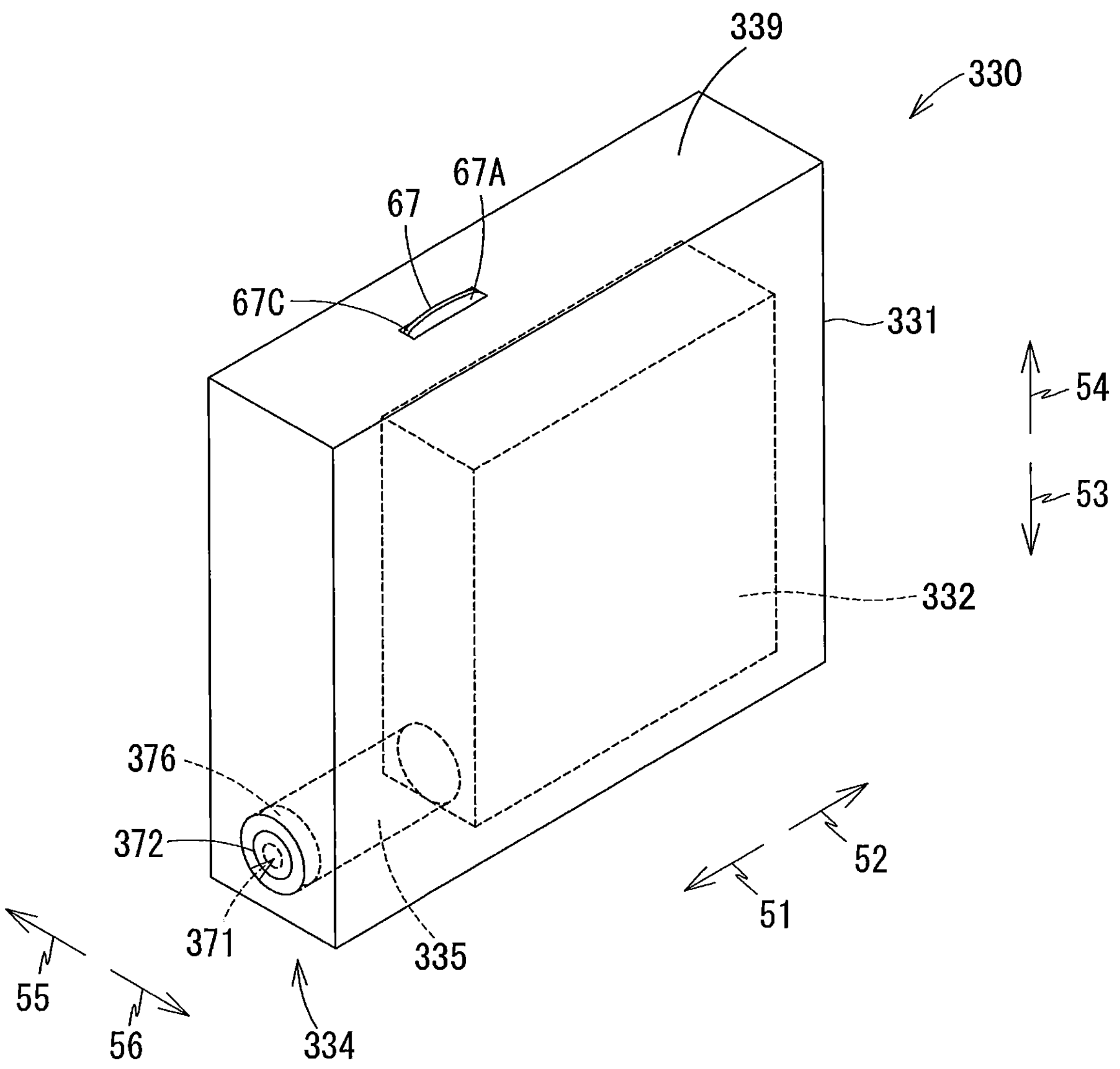
FIG. 11 is a perspective view of an ink cartridge according to a second modification to the embodiment as viewed from its front side.

The ink cartridge 30 is not limited to the structure illustrated in FIGS. 4 through 6. As an example, FIG. 11 depicts an ink cartridge 330 according to a second modification to the embodiment. The ink cartridge 330 of the second modification has an outer shape that approximates a rectangular parallelepiped. Specifically, the ink cartridge 330 includes a casing 331 of a rectangular parallelepiped shape. A storage chamber 332 is defined in the casing 331, and an ink supply portion 334 extends frontward from the storage chamber 332. An internal space in the ink supply portion 334 serves as a chamber 335 proving communication between the storage chamber 332 and the exterior of the casing 331.

The ink cartridge 330 having the configuration shown in FIG. 11 does not include the protruding portion 83 and the circuit board 64. The ink cartridge 330 does not include the coil spring 78 in the chamber 335, either. Therefore, the ink cartridge 330 need not be inserted into the cartridge-attachment section 110 against a rearward urging force.

Further, the ink cartridge 330 of the second modification does not include the valve 77 in the chamber 335. Rather, in the ink supply portion 334 of the second modification, a packing 376 is provided in an open front end of the ink supply portion 334, and an ink supply port 371 is formed in the center of the packing 376. The ink supply port 371 is sealed with a peelable seal 372. As the ink cartridge 330 is inserted in to the cartridge-attachment section 110, the ink needle 102 provided in the cartridge-attachment section 110 pierces the seal 372 and passes through the ink supply port 371. At this time, ink stored in the storage chamber 332 of the ink cartridge 330 can be supplied into the interior space 102A of the ink needle 102 through the chamber 335 and ink supply port 371. Further, the ink needle 102 elastically deforms the packing 376 while penetrating the same. As a result, the outer circumferential surface of the ink needle 102 closely contacts an inner circumferential surface of the packing 376 defining the ink supply port 371, thereby preventing ink from leaking through gaps formed between the ink needle 102 and the packing 376.

As in the depicted embodiment, the light-blocking portion 67A protrudes upward relative to a top wall 339 of the casing 331 by the second protruding length L2 when the light-blocking plate 67 is at the second position (see FIG. 6). However, the light-blocking portion 67A need not protrude above the top wall 339 when the light-blocking plate 67 is in the second position. That is, the upper edge 67T of the light-blocking portion 67A may be positioned below the upper surface of the top wall 339 when the light-blocking plate 67 is at the second position.

Figure 12:
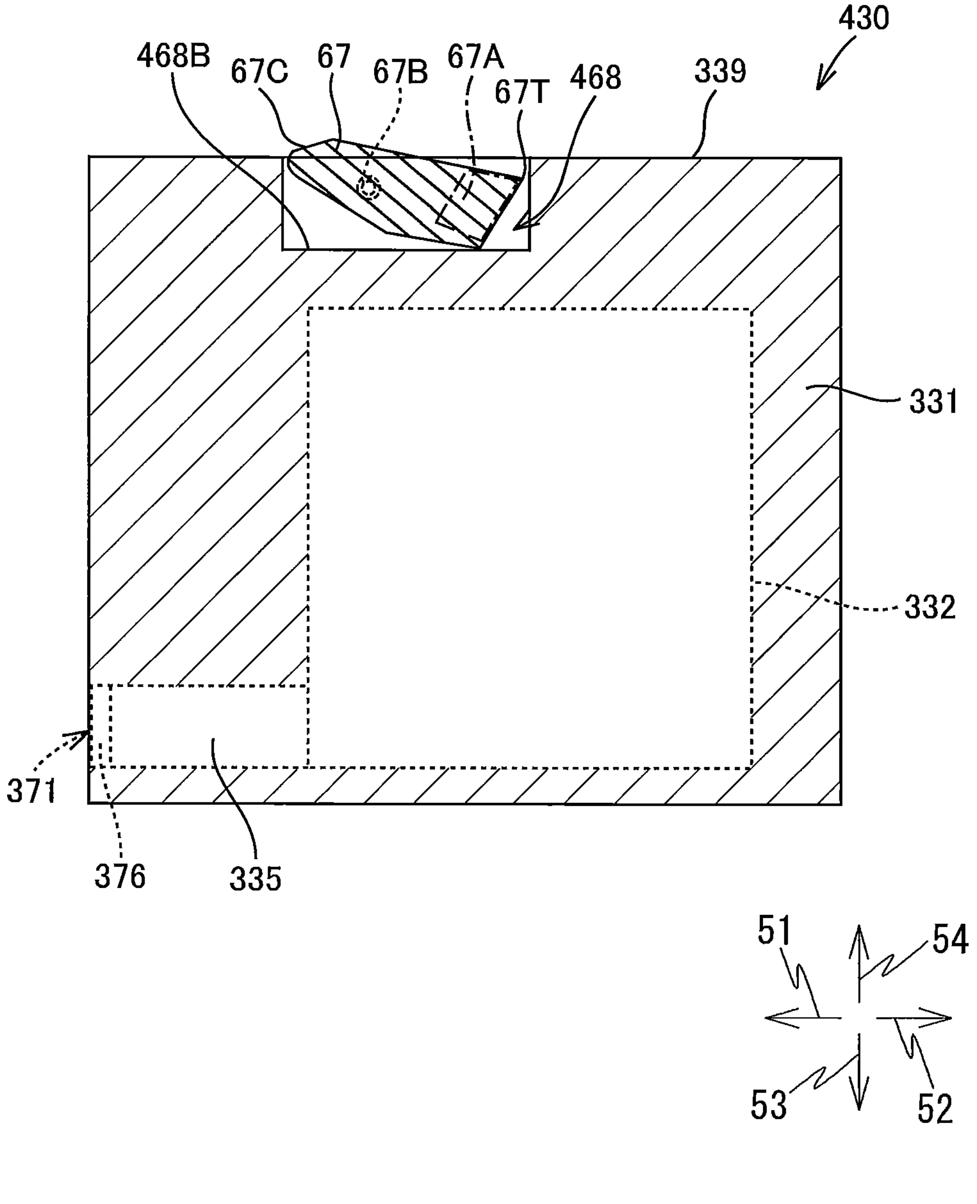
FIG. 12 is a vertical cross-sectional view of an ink cartridge according to a third modification to the embodiment provided with the light-blocking plate according to the embodiment, wherein the light-blocking plate is at its second position.

As an example, FIG. 12 depicts an ink cartridge 430 according to a third modification to the embodiment. The ink cartridge 430 includes the casing 331 of the second modification, and the light-blocking plate 67 of the depicted embodiment. The light-blocking plate 67 is configured to be accommodated in a recess 468 formed in the top wall 339 of the casing 331. The recess 468 has a deeper depth than the recess 68 of the embodiment in the vertical direction. Hence, as depicted in FIG. 12, when the light-blocking plate 67 is at the second position, a rear end portion of the light-blocking plate 67 is in contact with a bottom surface 468B of the recess 468 and the light-blocking portion 67A in its entirety is accommodated in the recess 468. That is, at the second position, the upper edge 67T of the light-blocking portion 67A does not protrude upward relative to the top wall 339, but is located below the upper surface of the top wall 339 and accommodated in the recess 468. The force-receiving portion 67C of the light-blocking plate 67 protrudes upward relative to the upper surface of the top wall 339 at the second position, as in the depicted embodiment.

In the embodiment, the ink cartridge 30 is retained in its attached state in the cartridge-attachment section 110 by the sliding resistance between the ink needle 102 and the inner circumferential surface of the packing 76. However, the means for retaining the ink cartridge 30 in its attached state in the cartridge-attachment section 110 are not limited to the means employing sliding friction. For example, the ink cartridge 30 may be configured to pivot inside the cartridge-attachment section 110 so that an engaging part provided on the ink cartridge 30 becomes engaged with an engagement part provided in the cartridge-attachment section 110, and the ink cartridge 30 may be retained in its attached state in the cartridge-attachment section 110 through this engagement.

In the embodiment, the light-blocking plate 67 moves from the second position to the first position when contacted on the force-receiving portion 67C by the cartridge-attachment section 110 (the rear surface 126A of the projecting wall 126) from the front side of the light-blocking plate 67. However, the light-blocking plate 67 may move from the second position to the first position through contact by the cartridge-attachment section 110 from a side other than the front side. For example, in a case where the ink cartridge 30 is configured to pivot inside the cartridge-attachment section 110 as described above, the cartridge-attachment section 110 may come into contact with the light-blocking plate 67 from above or below as the ink cartridge 30 pivots, forcing the light-blocking plate 67 to move from the second position to the first position.

The positional relationships of components in the ink cartridge 30 and cartridge-attachment section 110 are also not limited to those described in the embodiment.

For example, while the entire light-blocking plate 67 is positioned above the imaginary plane P1 (see FIG. 6) passing through the top edge of the interior space in the ink cartridge 30 (the first storage chamber 32, second storage chamber 33, and air communication chamber 36) in the embodiment, the light-blocking portion 67A may be positioned lower than the imaginary plane P1 to protrude into the interior space of the ink cartridge 30 when the light-blocking plate 67 is at the second position.

Further, in the embodiment, the force-receiving portion 67C has a portion positioned above the upper surface of the top wall 39 when the light-blocking plate 67 is at the first position, as shown in FIG. 3. However, while the light-blocking plate 67 is at the first position, the force-receiving portion 67C may be located either below or above the upper surface of the top wall 39. If the force-receiving portion 67C in its entirety is positioned above the top wall 39 when the light-blocking plate 67 is at the first position, there is no need to form a space beneath the upper surface of the top wall 39 for accommodating the force-receiving portion 67C therein. Note that the force-receiving portion 67C should be located above the top wall 39 (protrudes relative to the top wall 39) while the light-blocking plate 67 is at the second position in order to ensure that the force-receiving portion 67C comes into contact with the projecting wall 126 (rear surface 126A) during the insertion of the ink cartridge 30 into the cartridge-attachment section 110.

Still further, the light-blocking plate 67 may be positioned farther forward than the ink supply port 71.

In the embodiment, the distance S1 between the axis X and light-blocking portion 67A is greater than the distance S2 between the axis X and the force-receiving portion 67C when the light-blocking plate 67 is at the first position. However, the distance S1 may be set smaller than or equal to the distance S2.

In case that the distance S1 is shorter than the distance S2, the light-blocking plate 67 can be maintained at the second position by: configuring the portion of the light-blocking plate 67 having the shorter front-rear dimension S1 (the portion positioned rearward of the axis X) heavier than the portion having the longer front-rear dimension S2 (the portion positioned rearward of the axis X); or by providing a coil spring or other urging member to normally urge the light-blocking plate 67 toward the second position.

In the embodiment, the portion of the light-blocking plate 67 that is rearward of the axis X is heavier than the portion of the light-blocking plate 67 that is forward of the axis X. However, the rearward portion may be set to the same or a smaller weight than the forward portion. In this case, a coil spring or other urging member for urging the light-blocking plate 67 toward the second position may be used to move the light-blocking plate 67 into the second position when external forces are not being applied to the light-blocking plate 67.

The plate-shaped light-blocking plate 67 serves as the lever in the embodiment described above. However, the lever need not be a plate-shaped member as in the embodiment. Needless to say, the shape of the space formed in the top wall of the casing 31 to accommodate the lever may be modified to conform to the shape of the lever.

Further, while ink serves as an example of liquid in the depicted embodiments, the liquid of the present disclosure is not limited to ink. For example, a pretreatment liquid that is ejected onto sheets prior to ink during a printing operation may be stored in the liquid cartridge. Alternatively, cleaning water for cleaning the recoding head 21 may be stored in the liquid cartridge.

<Remarks>

The ink cartridges 30, 230, 330 and 430 are respectively an example of a liquid cartridge. The casings 31 and 331 are respectively an example of a casing. The first storage chamber 32 and second storage chamber 33 are an example of a liquid chamber. The storage chamber 332 is another example of the liquid chamber. The ink valve chamber 35 and chamber 335 are respectively an example of a liquid passage. The front wall 40 is an example of a front wall. The rear wall 41 is an example of a rear wall. The top walls 39 and 339 are an example of a top wall. The bottom wall 42 is an example of a bottom wall. The light-blocking plates 67 and 267 are an example of a lever. Each of the light-blocking portions 67A and 267A is an example of a light-blocking portion. The force-receiving portions 67C and 267D are respectively an example of a force-receiving portion. The upper edge 67T of the light-blocking portion 67A and upper edge 267T of the light-blocking plate 267 are an example of an upper end of the light-blocking portion. The bottom surfaces 68B and 468B are an example of a supporting surface. The ink supply ports 71 and 371 are an example of a liquid-supply port. The IC board 64 and electrodes 65 are an example of a circuit board. The system 1 is an example of a system. The printer 10 is an example of a printer. Each of the cartridge-attachment sections 110 and 210 is an example of a cartridge-attachment section. The accommodation space 111 is an example of an accommodation space. The optical sensor 113 is an example of an optical sensor. The ink needle 102 is an example of a liquid-supply tube. The contacts 106 are an example of an electrical contact. The projecting wall 126 and its rear surface 126A, and the projecting wall 226 and its rear surface 226A are respectively an example of a projecting wall. The frontward direction 51 is an example of an insertion direction.

What is claimed is:

1. A liquid cartridge comprising:

a housing including a liquid chamber storing liquid therein;

a liquid passage extending from the liquid chamber in a frontward direction, the frontward direction crossing a gravitational direction in an upright posture, the liquid passage having a front end in the frontward direction at which a liquid supply port is formed;

a plate pivotable about an axis between a first position and a second position, the plate being positioned above the liquid chamber in the upright posture; and a circuit board, the circuit board being positioned above the liquid chamber in the upright posture, wherein the plate has an upper edge in the upright posture, and the upper edge of the plate is positioned lower at the second position than at the first position in the upright posture, and wherein the circuit board is positioned above the upper edge of the plate at the first position and rearward relative to the plate in the frontward direction in the upright posture.

2. The liquid cartridge according to claim 1, wherein the plate has a sloped surface, the sloped surface sloping relative to the frontward direction to face upward and frontward in the upright posture.

3. The liquid cartridge according to claim 2, wherein the sloped surface of the plate is positioned lower at the first position than at the second position in the upright posture.

4. The liquid cartridge according to claim 3, wherein the housing includes a top wall, the top wall being positioned above the liquid chamber in the upright posture, the top wall being formed with an opening that is open upward in the upright posture, and wherein the sloped surface of the plate is movable through the opening of the top wall in accordance with pivoting of the plate between the first position and the second position, the sloped surface being positioned above the opening of the top wall at the second position, at least a portion of the sloped surface being positioned below the opening of the top wall at the first position.

5. The liquid cartridge according to claim 4, wherein an upper end of the sloped surface of the plate is positioned below the opening of the top wall at the first position in the upright posture.

6. The liquid cartridge according to claim 5, wherein the circuit board includes a plurality of electrodes, the plurality of electrodes facing upward in the upright posture, and wherein the upper end of the sloped surface of the plate at the second position is positioned below a front end of each of the plurality of electrodes in the upright posture.

7. The liquid cartridge according to claim 1, wherein the circuit board includes a plurality of electrodes, the plurality of electrodes facing upward in the upright posture, and wherein the upper edge of the plate at the second position is positioned below a front end of each of the plurality of electrodes in the upright posture.

8. The liquid cartridge according to claim 7, wherein the housing includes a top wall, the top wall being positioned above the liquid chamber in the upright posture, the top wall being formed with an opening that is open upward in the upright posture, and wherein the front end of each of the plurality of electrodes is positioned above the opening of the top wall in the upright posture.

9. A liquid cartridge comprising:

a front wall and a rear wall positioned opposite the front wall with respect to a front-rear direction;

a top wall and a bottom wall positioned opposite the top wall with respect to an up-down direction which is perpendicular to the front-rear direction;

a liquid supply portion positioned at the front wall;

a plate positioned above a liquid chamber in the up-down direction, the plate being pivotable about an axis between a first position and a second position; and a circuit board positioned above the liquid chamber in the up-down direction, wherein the plate has an upper edge in the upright posture, and the upper edge of the plate is positioned lower at the second position than at the first position in the up-down direction, and wherein the circuit board is positioned above the upper edge of the plate at the first position in the up-down direction and rearward relative to the plate in the front-rear direction.

10. The liquid cartridge according to claim 9, wherein the plate has a sloped surface sloping relative to the front-rear direction to face upward and frontward.

11. The liquid cartridge according to claim 10, wherein the sloped surface of the plate is positioned lower at the first position than at the second position in the up-down direction.

12. The liquid cartridge according to claim 11, wherein the top wall is formed with an opening that is open upward in the up-down direction, and wherein the sloped surface of the plate is movable through the opening of the top wall in accordance with pivoting of the plate between the first position and the second position, the sloped surface being positioned above the opening of the top wall at the second position, at least a portion of the sloped surface being positioned below the opening of the top wall at the first position.

13. The liquid cartridge according to claim 12, wherein an upper end of the sloped surface of the plate is positioned below the opening of the top wall in the up-down direction at the first position.

14. The liquid cartridge according to claim 13, wherein the circuit board includes a plurality of electrodes facing upward in the up-down direction, and wherein the upper end of the sloped surface of the plate at the second position is positioned below a front end of each of the plurality of electrodes in the up-down direction.

15. The liquid cartridge according to claim 9, wherein the circuit board includes a plurality of electrodes facing upward in the up-down direction, and wherein the upper edge of the plate at the second position is positioned below a front end of each of the plurality of electrodes in the up-down direction.

16. The liquid cartridge according to claim 15, wherein the top wall is formed with an opening that is open upward in the up-down direction, and wherein the front end of each of the plurality of electrodes is positioned above the opening of the top wall in the up-down direction.

* * * * *